US006125307A

United States Patent [19]

Heidel et al.

[11] Patent Number: 6,125,307

[45] Date of Patent: Sep. 26, 2000

[54] GAMING MACHINE PAYOUT TRANSPORTSYSTEM

[75] Inventors: Raymond J. Heidel, Henderson; Rodney Hill, Las Vegas; Thomas N. Taxon, Henderson; Lawrence McAllister, Las Vegas, all of Nev.

[73] Assignee: Bally Gaming, Inc., Las Vegas, Nev.

[21] Appl. No.: 09/264,293

[22] Filed: Mar. 8, 1999

Related U.S. Application Data

[62] Division of application No. 09/041,279, Mar. 11, 1998, Pat. No. 6,014,594.

[51] Int. Cl.[7] .......... G06F 17/00

[52] U.S. Cl. .......... 700/232; 194/207

[58] Field of Search .......... 273/143 R; 463/20, 463/42; 194/206, 207; 700/231, 232

[56] References Cited

U.S. PATENT DOCUMENTS

| | | | |
|---|---|---|---|
| 4,113,140 | 9/1978 | Graef et al. . | |
| 4,283,709 | 8/1981 | Lucero et al. | 463/42 |
| 4,570,801 | 2/1986 | Brannen . | |
| 4,636,951 | 1/1987 | Harlick | 463/42 |
| 4,871,085 | 10/1989 | Graef et al. . | |
| 4,880,237 | 11/1989 | Kishishita . | |
| 4,964,638 | 10/1990 | Ishida | 273/143 R |
| 5,071,031 | 12/1991 | Yuge et al. . | |
| 5,116,055 | 5/1992 | Tracy | 273/143 R |
| 5,179,517 | 1/1993 | Sarbin et al. . | |
| 5,265,874 | 11/1993 | Dickinson et al. | 273/138 A |
| 5,290,033 | 3/1994 | Bittner et al. . | |
| 5,332,076 | 7/1994 | Ziegert . | |
| 5,393,061 | 2/1995 | Manship et al. | 273/143 R |
| 5,511,784 | 4/1996 | Furry et al. | 273/143 R |
| 5,513,773 | 5/1996 | Cargill . | |
| 5,515,959 | 5/1996 | Stephenson, III et al. . | |
| 5,544,728 | 8/1996 | Dabrowski | 194/206 |
| 5,559,312 | 9/1996 | Lucero . | |
| 5,570,885 | 11/1996 | Ornstein | 463/27 |
| 5,580,310 | 12/1996 | Orus et al. . | |
| 5,586,936 | 12/1996 | Bennett et al. | 463/42 |
| 5,611,730 | 3/1997 | Weiss | 463/20 |
| 5,715,924 | 2/1998 | Takemoto et al. | 194/206 |
| 5,740,897 | 4/1998 | Gauselmann | 194/206 |
| 5,743,799 | 4/1998 | Houriet, Jr. et al. | 463/25 |
| 5,813,914 | 9/1998 | McKay et al. | 273/143 R |

*Primary Examiner*—Christopher P. Ellis
*Assistant Examiner*—Joe Dillon, Jr.
*Attorney, Agent, or Firm*—Brown Raysman Millstein Felder & Steiner, LLP

[57] ABSTRACT

In a system and method for a payout in the form of paper tokens from a gaming machine, the system includes a hopper for dispensing the paper tokens, a cassette for containing the paper tokens, and software for controlling the operations of the payout of the paper tokens from the gaming machine. The cassette and hopper are located in the gaming machine in plain view of a player, and are locked for security purposes. Each paper token is transported through a payout path by mechanisms in the cassette and the hopper which interact to dispense a paper token. A plurality of sensors sense the transport of the paper token through the payout path, the operation of the transport mechanism, and the status of the paper token supply. An escrow area is provided in the cassette for rejected paper tokens, as sensed by sensors and diverted by a diverting mechanism into the escrow area. A memory element in the cassette stores operational information regarding dispensing of the paper tokens. A communicating device in the gaming machine sends messages to a central monitoring system regarding the gaming machine operations. Monitoring devices monitor security and accounting functions of the gaming machines, including security cameras which monitor the payout of the paper tokens from a gaming machine after being signalled by the system that the payout is about to begin.

13 Claims, 16 Drawing Sheets

GAMING MACHINE PAYOUT TRANSPORTSYSTEM

BACKGROUND OF THE INVENTION

This is a divisional application of application Ser. No. 09/041,279, filed Mar. 11, 1998 and issuing Jan. 11, 2000 as U.S. Pat. No. 6,014,594.

1. Field of the Invention

This invention relates generally to improvements in gaming machines and, more particularly, to a new and improved system and method for dispensing a payout in the form of paper tokens from a gaming machine, whereby software-controlled dispensing of the paper tokens provides enhanced player satisfaction and excitement, while providing improved gaming machine reliability, security, and accountability.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Related Art

In a typical casino gaming machine, a player inserts currency, such as tokens, coins, scrip or paper denominations, into the gaming machine to activate play. In addition, a player may insert a gaming card into the machine and designate the number of credits to be played. If the particular pay results in a winning combination, the gaming machine dispenses the appropriate payout for that particular combination.

In such an event, the win is frequently dispensed from the gaming machine in the form of coin tokens or coins which are stored in the gaming machine's coin hopper. In another embodiment, the gaming machine may provide credits to a player's gaming card that has been inserted into the machine.

Where the win is dispensed in the form of coin tokens or coins, the gaming machine accesses a coin hopper in order to make the payout. However, the coin hopper only has a limited storage capacity, e.g. 400–800 coins, and this can limit the amount of payouts and the size of the payouts that can be made. In fact, if a substantial win occurs, an attendant may be required to make the payout to the player.

In the event that a large number of payouts has occurred within a short period of time, the coin hopper can run out of coin tokens or coins. This results in a problem for casinos in that player dissatisfaction can occur, it requires the casino to refill the hopper, and the time the machine is off-line results in no play on the gaming machine and, consequently, a loss of income to the casino.

Moreover, with the inclusion of bill acceptors into gaming machines, the risk of the hopper running low or empty is exacerbated. In this case, players insert paper denominations or script into the machine and are still paid out via coin tokens or coins. In this regard, when the player inserts paper currency into the machine, the coin tokens paid out from the hopper are not replenished. This results in the need for additional fills to the gaming machine more often than before the inclusion of bill acceptors, which results in higher operating costs to the casinos, and in greater player dissatisfaction when the machine fails to payoff and/or when it is taken off-line.

Clearly, dispensing payouts from gaming machines in the form of paper tokens such as paper money, paper scrip, or gift certificates provides advantages over coin tokens in convenience, security, reliability, and entertainment value for casinos and players. However, there may also be problems associated with dispensing paper tokens. Paper tokens do not make noise when hitting a tray, and therefore a player might not be aware that he or she has been paid. In other words, coin tokens or coins which are dispensed from gaming machines direct the player's attention to the payout by making noise when they hit the coin tray, so that a player knows he or she has been paid. The player can easily view the coin tray, and the coin tokens or coins collect in the coin tray where they can be readily retrieved by the player. In addition, paper tokens are lightweight and might miss the tray entirely and fall to the floor, causing an apparent short payout from the gaming machine.

Moreover, security is a major issue in the gaming industry, including the prevention of theft by customers and employees. It is important to provide systems in gaming machines to insure the integrity of the dispenser and the paper tokens to be dispensed therefrom. Security measures are consequently necessary to monitor the installation and removal of the dispenser and the paper tokens. Further, security measures are necessary to verify and insure that the proper denomination of bills in a paper token dispenser are being inserted into a gaming machine. And obviously, monitoring of the actual dispensing of paper tokens to the player is important to the security of the overall system.

Tight accounting controls and internal operating procedures for tracking and reporting on the flow of money are also essential for casino operations. Also, state regulatory agencies have placed specific requirements on casinos regarding the handling, counting, and distribution of money and tokens within the casino, which must be followed. Still further, money in and out of each gaming machine must be tracked on a machine-by-machine basis to measure and insure proper operation of each gaming machine. Accordingly, such accounting requirements must be taken into account in systems which dispense paper tokens.

In addition, an important security and accounting concern for casinos is the ability to track and monitor the amount of money and quantity of tokens in and out of the dispensers. Also, the data generated in the gaming machine, required for reconciliation of security and accounting data, needs to be readily and reliably available from the gaming machine.

Even casinos which do not have central systems for collecting data regarding the operations of their gaming machines would benefit from the use of paper token dispensers for added player convenience. Data collected in such casinos regarding gaming machine operations would need to be collectable in and retrievable from the gaming machine. Further, technicians in such casinos would need an indication on the gaming machine to signal malfunctions of the dispenser or to signal a low condition of paper tokens in the dispenser. If a gaming machine is broken or in a non-operational state, the machine's earnings decrease, with corresponding increase in casino cost and player dissatisfaction. It is, therefore, important to maximize the up time of gaming machines through efficient and effective maintenance capabilities.

Moreover, in gaming machines, critical space constraints require the placing of the dispensing system for paper tokens in an optimal manner.

Furthermore, enabling the speed of dispensing paper tokens from the dispenser to be dependent on the player would provide a more entertaining and enjoyable reward cycle for the player, increasing player satisfaction in playing the game.

In view of these considerations, effective operational, security, and accounting systems must be implemented in a paper token dispensing system for the dispensers which dispense the paper tokens, the containers which contain the paper tokens, and for the gaming machines in which the dispensers and containers are installed.

Therefore, those concerned with the development and use of improved gaming machines and the like have long recognized the need for improved systems and methods for dispensing tokens from gaming machines, that is, a system which can alert the casino to low token or hopper states (preemptive fill) while minimizing gaming machine operating and maintenance costs, track player payouts, track and monitor paper token cassettes/containers, and that pays out to the player in a fast, efficient and effective manner while still maintaining player excitement and satisfaction. Accordingly, the present invention fulfills these needs by providing efficient and effective dispensing of the paper tokens under the control of the software for enhanced gaming machine operations and increased player enjoyment.

SUMMARY OF THE INVENTION

Briefly, and in general terms, the present invention provides a new and improved system for dispensing, containing, tracking and monitoring paper tokens in gaming machines in a reliable secure, verifiable, and convenient manner, while enhancing player satisfaction and excitement and reducing operating and maintenance costs. The system provides software-controlled dispensing of paper tokens for increased player enjoyment and improved gaming machine operations.

By way of example, and not by way of limitation, the present invention provides a new and improved system and method for dispensing a payout in the form of paper tokens from a gaming machine, in addition to conventional metal tokens. The system may further include a plurality of gaming machines, each of which includes means for dispensing paper tokens, and a central monitoring system for monitoring the dispensing of paper tokens from the gaming machines. The system may also include a docking station for performing setup and accounting functions relating to the dispensing of paper tokens.

More particularly, the present invention includes means for dispensing paper tokens from a gaming machine, and software means for comprehensively controlling the operations of the payout of the paper tokens from the gaming machine in an efficient and effective manner. The hopper for dispensing paper tokens may be located in the gaming machine in a position so as to provide ease of use, to be readily visible to the player, i.e, operable so as to dispense and hold paper tokens in plain sight of the player, so as to direct the player's attention to the payout such that the player knows he or she has been properly paid. This prevents apparent short pays. Also the system provides security for insuring the integrity of the hopper and the paper tokens to be dispensed therefrom. This is accomplished by signaling security personnel that a payout of paper tokens is about to begin. Once signaled, the security personnel can then position casino security cameras so that the payout may be viewed and/or recorded to ensure proper payouts.

The system, in accordance with the present invention, also includes software for tracking hopper, cassette, and gaming machine operations. The system also provides an indication in a gaming machine to notify technicians of malfunctions or low paper token conditions which enable repairs to be made efficiently and effectively. This is particularly true for casinos which do not have an on-line data collection system because there is a great need for prominent notification of repairs required in order to enable prompt repairs to be made and to return the gaming machine to operability for the benefit of the casino and the players.

The system also is adapted to dispense paper tokens in the form of paper scrip. This embodiment reduces the lost-interest expense necessitated by filling and refilling a plurality of gaming machines. That is, the actual monetary currency can remain in a deposit account to earn interest as opposed to remaining idle in a gaming machine. Such an embodiment is enhanced since paper scrip is adaptable to be accepted in bill acceptors currently installed in gaming machines, and can be optimized for counterfeit detection by such bill acceptors.

The system of the present invention also provides a hopper adapted to dispense paper tokens optimally in view of space considerations in gaming machines, so as to reduce the effective width of the mechanism. The system further provides locking capabilities for both the hopper which dispenses the paper tokens and for the cassette which contains the paper tokens to prevent theft by both customers and casino employees.

The system, in accordance with the present invention, further provides accounting controls in the tracking and filling of paper tokens in hoppers and in cassettes. This may be accomplished using on-board memory on the cassette and/or via a central processing system. The system further provides an escrow area in the cassette for storing paper tokens rejected or jammed during the dispensing process. The system also maintains security and accounting controls for the dispensing of paper tokens.

The system of the present invention also monitors the installation and removal of the cassette and hopper, and tracks casino personnel having access to the paper tokens, to provide additional security for the system. The system further includes security measures to enhance system operations, including verification of the denomination of paper tokens inserted into the gaming machines.

The system of the present invention also enables rapid replacement of empty cassettes to minimize customer inconvenience and gaming machine down time, enabling convenient storage of the loaded cassettes at various locations in a casino, and effectively maintains theft prevention safeguards. The system further allows for dispensing of paper tokens one at a time, and monitors dispensing so as to enable manual counting of paper tokens being dispensed, to catch malfunctions and to reduce fraud.

The system further requires that the player remove a paper token before another paper token is dispensed for a payout, thereby increasing the length of the player reward cycle and further enhancing player satisfaction in playing the game. The system is also adapted to dispense paper tokens in the form of coupons or gift certificates for effective marketing and promotion.

Therefore, one advantage of the present invention is that it includes comprehensive software for effectively controlling the operations of the payout of the paper tokens from the gaming machine.

A further advantage is that the present invention reduces the number of coin fills required by maintaining coin hopper levels by providing an additional method of pay out and, therefore, reduces operating and maintenance expense for the casino. It also reduces the downtime of a machine and the need for an attendant to service the machine. Thus, the security of the machine is also enhanced.

Another advantage is that the present invention provides tracking information that can assist the casino in maintaining security and accounting in the gaming machine.

Still another advantage is that it provides players with an exciting and efficient method of payment. Not only can the player be paid in tokens or coins, but the player can now receive paper currency, e.g., bills or casino scrip. The use of currency reduces or eliminates the need for the player to take his winnings to the cashier. In turn, player satisfaction is increased and time spent playing the machines is increased.

Still another advantage is the ability to code (color or via on-board memory) the bill cassette for security and tracking purposes.

Still another advantage is the interfacing of the cassette with the gaming machine such that only the proper denomination or value of paper tokens in the cassette will be operable in a given machine. This eliminates the potential of a gaming machine inadvertently dispensing $100.00 bills in lieu of $20.00 bills.

Still another advantage is the locking mechanism for improved security.

Another advantage is the placement of the bill dispenser in the machine at a location in plain sight for the player. This placement enhances player satisfaction and excitement. It also reduces the chance that bills will fall into a payout hopper or onto the floor without notice. Also, it maintains security, by allowing for the counting of bills through a camera focused on the bill dispenser location, which may always be on or be activated in response to a signal sent to security that the dispensing is about to begin, or under the physical observation of an attendant.

Still another advantage is providing the escrow of bills rejected for dispensing, such as for a double feed which aids in proper dispensing of tokens and minimizes attendant involvement for every jam or paper token rejection.

These and other objects and advantages of the invention will become apparent from the following more detailed description, when taken in conjunction with the accompanying drawings of illustrative embodiments.

DETAILED DESCRIPTION OF THE PREFERRED EMBODIMENTS

The present invention is directed to an improved system and method for dispensing paper tokens from a gaming machine which is convenient and entertaining for the player, and which is efficient, secure and reliable for the casino. The improved system and method provides effective dispensing of paper tokens in an efficient manner, under the operational control of the software.

Figure 1:
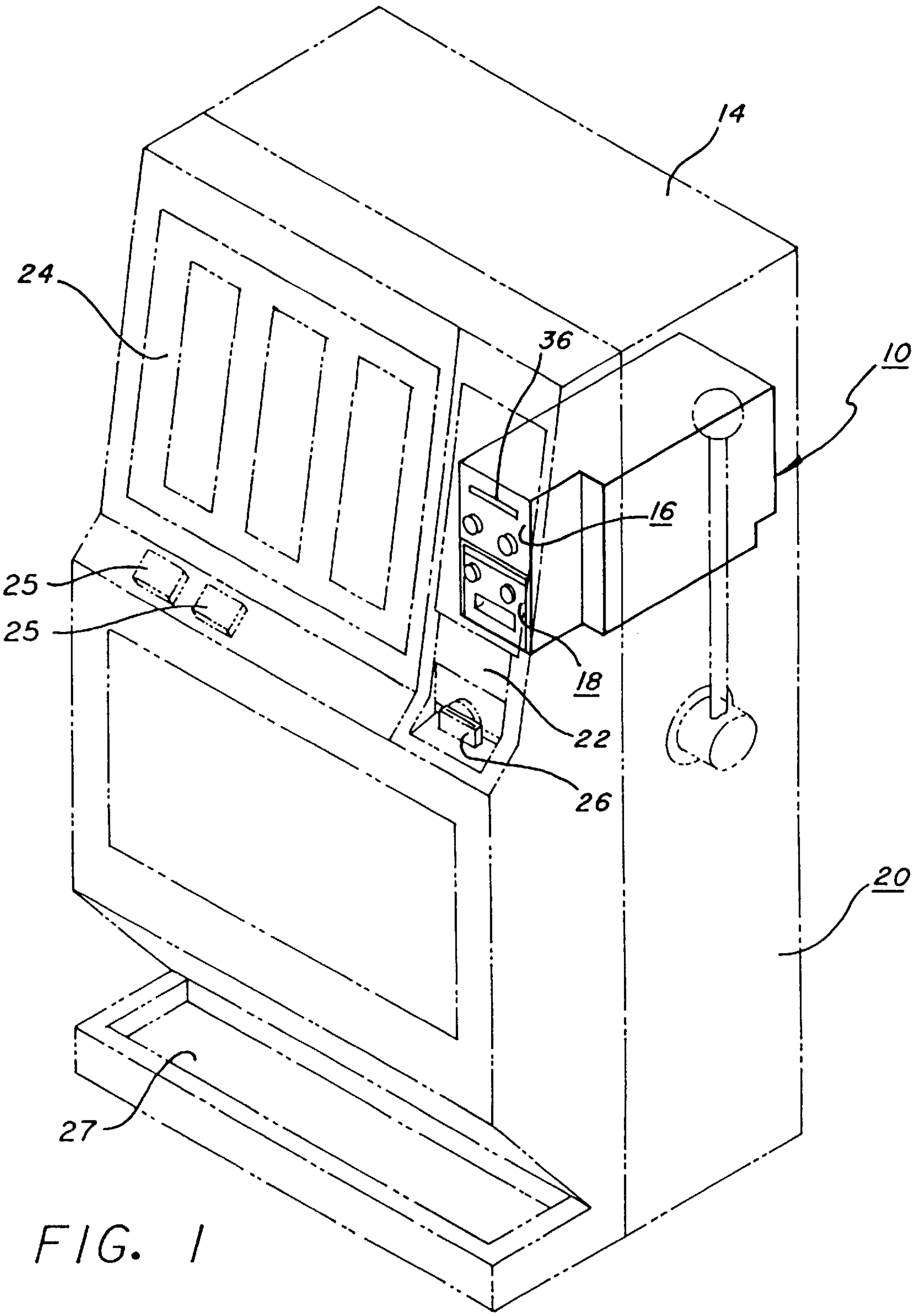
FIG. 1 is a perspective view of a gaming machine in accordance with the present invention in which a hopper is installed for dispensing paper tokens, and in which a cassette for containing paper tokens is installed.

Referring now to the drawings, wherein like reference numerals denote like or corresponding parts throughout the drawing figures and, particularly to FIG. 1, a system 10 is utilized for dispensing a payout in the form of paper tokens 12 from a gaming machine 14. The paper tokens 12 comprise paper money, paper scrip, or a gift certificate. In other words, the paper money may comprise United States currency or currency of other countries, the paper scrip may comprise preprinted casino scrip, and the gift certificate may comprise a coupon. The system 10 includes a hopper 16 for dispensing the paper tokens 12, adapted to be installed in the gaming machine 14, and a cassette 18 for containing the paper tokens, adapted to be installed in the hopper 16.

Figure 6:
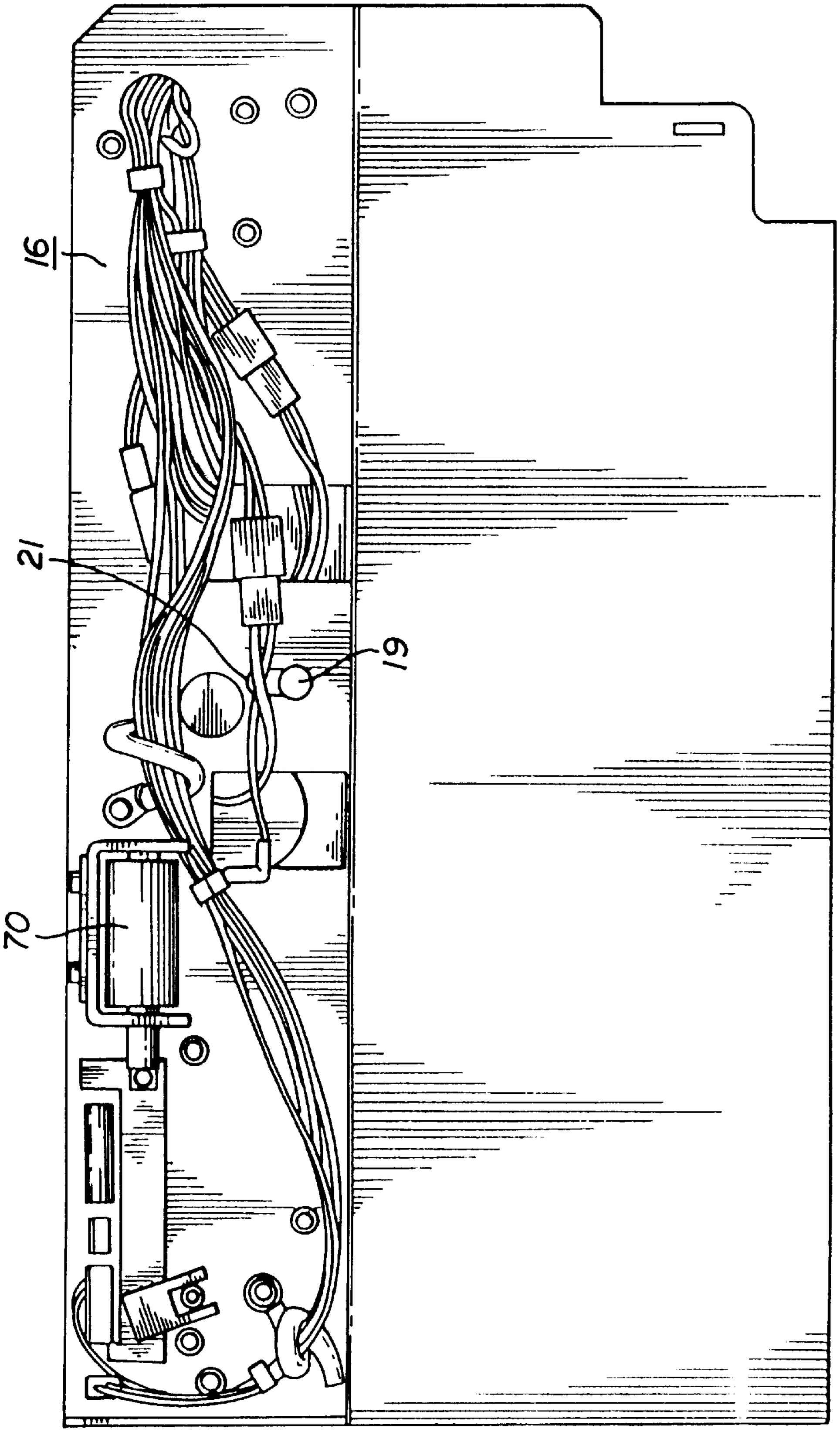
FIG. 6 is an elevational view of one side of a hopper, in the practice of the invention.
Figure 7:
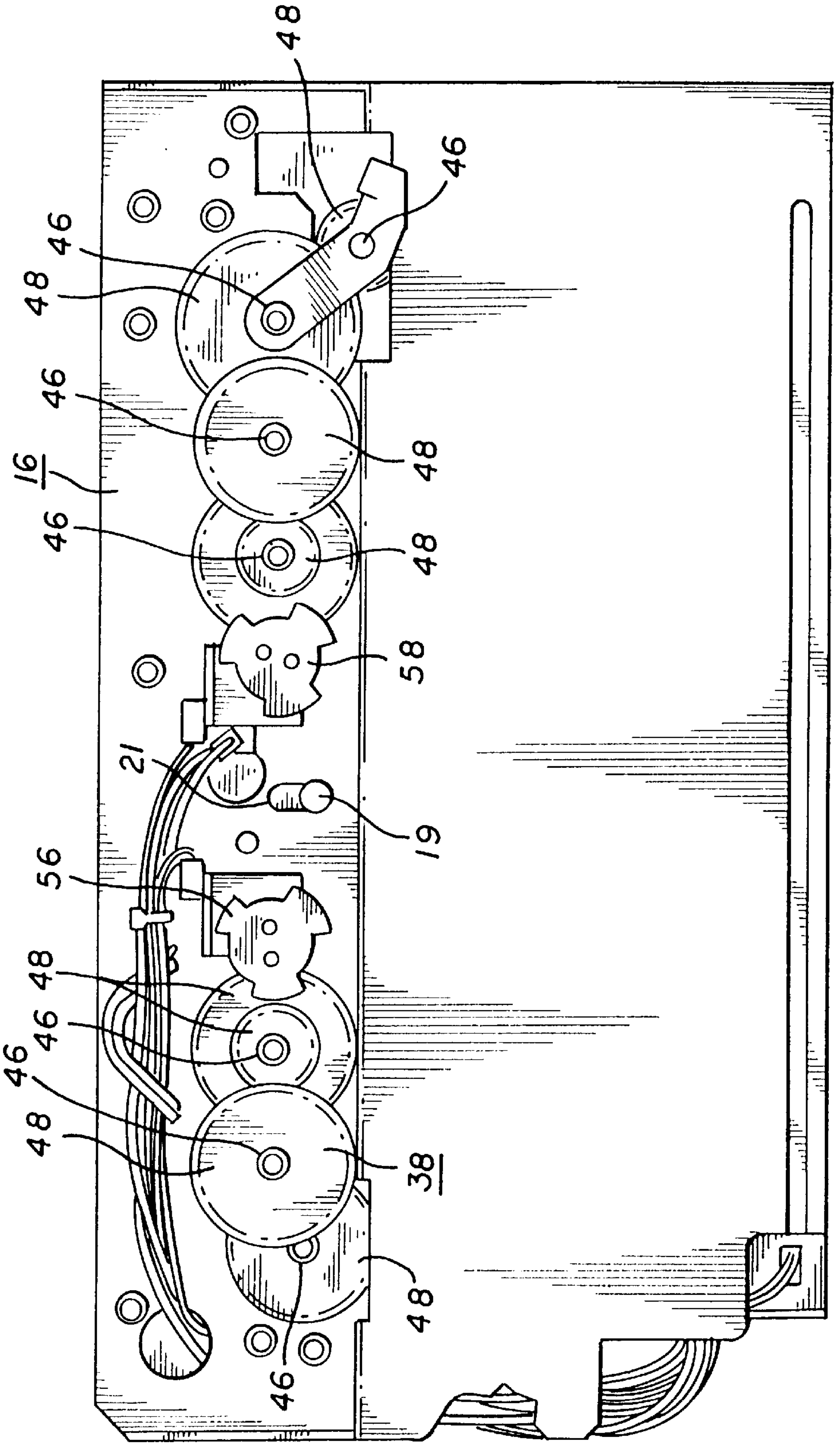
FIG. 7 is an elevational view of another side of a hopper, in the practice of the invention.

As illustrated in FIG. 1, the gaming machine 14 includes a housing 20 in which the hopper 16 is adapted to be installed. The housing 20 includes a frame permanently mounted therein for the hopper 16, which frame includes a power supply, control electronics, and connecting cables. As shown in FIGS. 6 and 7, a bar 19 is slidable in slots 21 and engages a tab (not shown) in the frame in the housing 20, to lock the hopper 16 in the housing frame in the gaming machine 14. Referring to FIG. 1, the hopper 16 is an assembly of paper dispensing mechanisms including wheels, gears, and belts, which slides and locks into the frame. The cassette 18 is a secured locked paper token box that holds the paper tokens 12 to be dispensed, which slides and locks into the hopper 16. The housing 20 also includes a front panel 22. The gaming machine 14 further includes a game play display 24, typically being a video monitor or spinning drums commonly called a slot machine, push buttons 25 in a slot machine, and one or more mechanisms 26 for accepting a wager. Alternatively, the hopper 16 and the wager accepting mechanisms 26 may be integrated into a single mechanism (not shown) which includes a mechanism for accepting wagers in the form of paper tokens 12 of the same denomination, and a mechanism for transporting the paper tokens from the accepting mechanism for dispensing thereof from the hopper 16. Alternatively, the system 10 may include a mechanism (not shown) for accepting and separating a wager of paper tokens 12 of different denominations, and a mechanism for separately transporting paper tokens 12 in accordance with the denominations thereof required for a payout. The gaming machine 14 also includes a coin token dispenser (not shown) which dispenses coin tokens into a tray 27.

As shown in FIG. 1, the hopper 16 is adapted to be installed in the frame and located in the housing 20 adjacent the front panel 22 and proximate the game play display 24. It is preferably located proximate the top and in the right side of the front panel 22, in plain view of the player. It is also easily viewable by casino security cameras and personnel in this position. The hopper 16 is located above the wager accepting element 26, and preferably aligned therewith such that a central line of a paper token 12 dispensed by the hopper 16 is in line with a central line of a wager accepted by the wager accepting element 26. In this way, the player can readily see the hopper 16 and view each paper token 12 as it is dispensed from the hopper 16.

Figure 3:
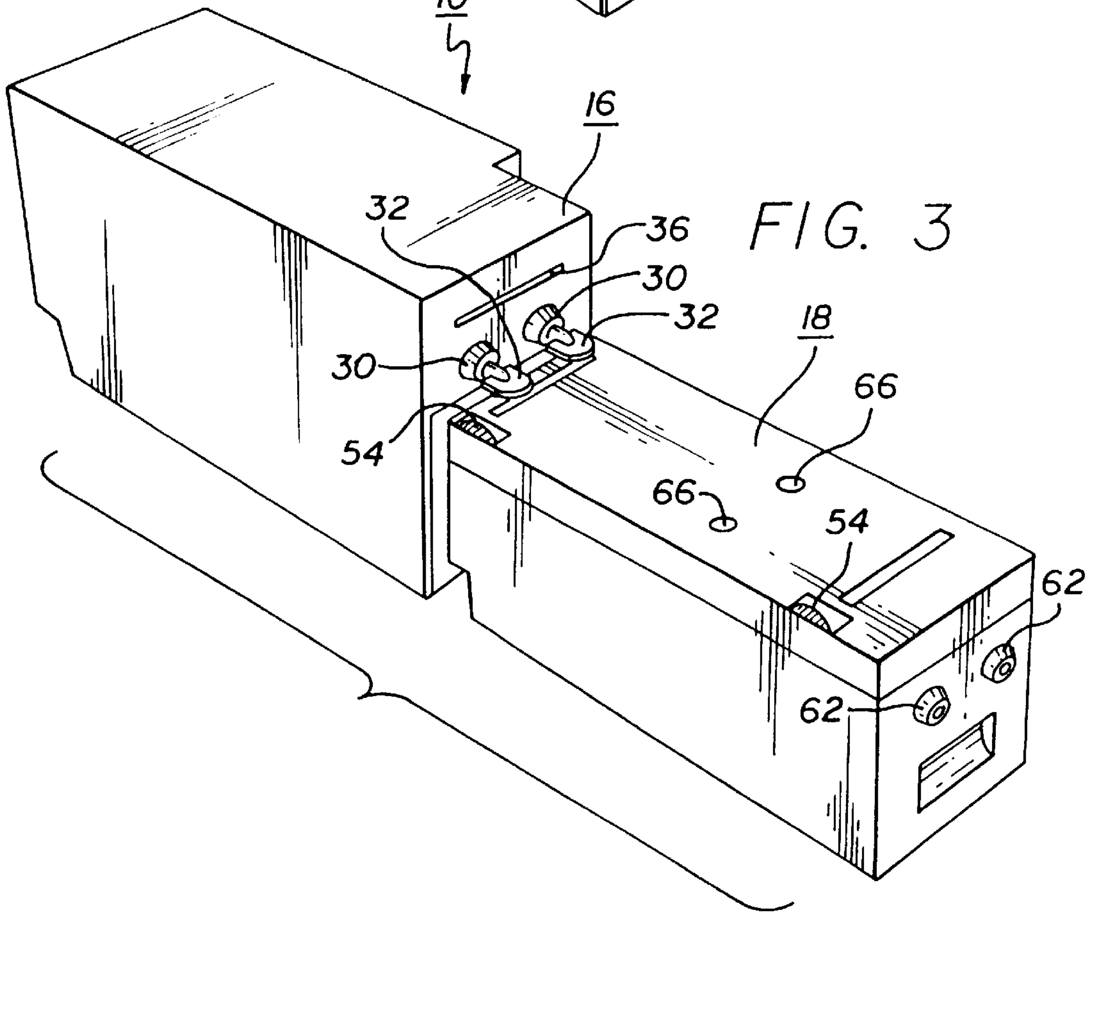
FIG. 3 is a partly exploded perspective view of a hopper and a cassette positioned so as to enable installation of the cassette into the hopper, in accordance with the present invention.
Figure 5:
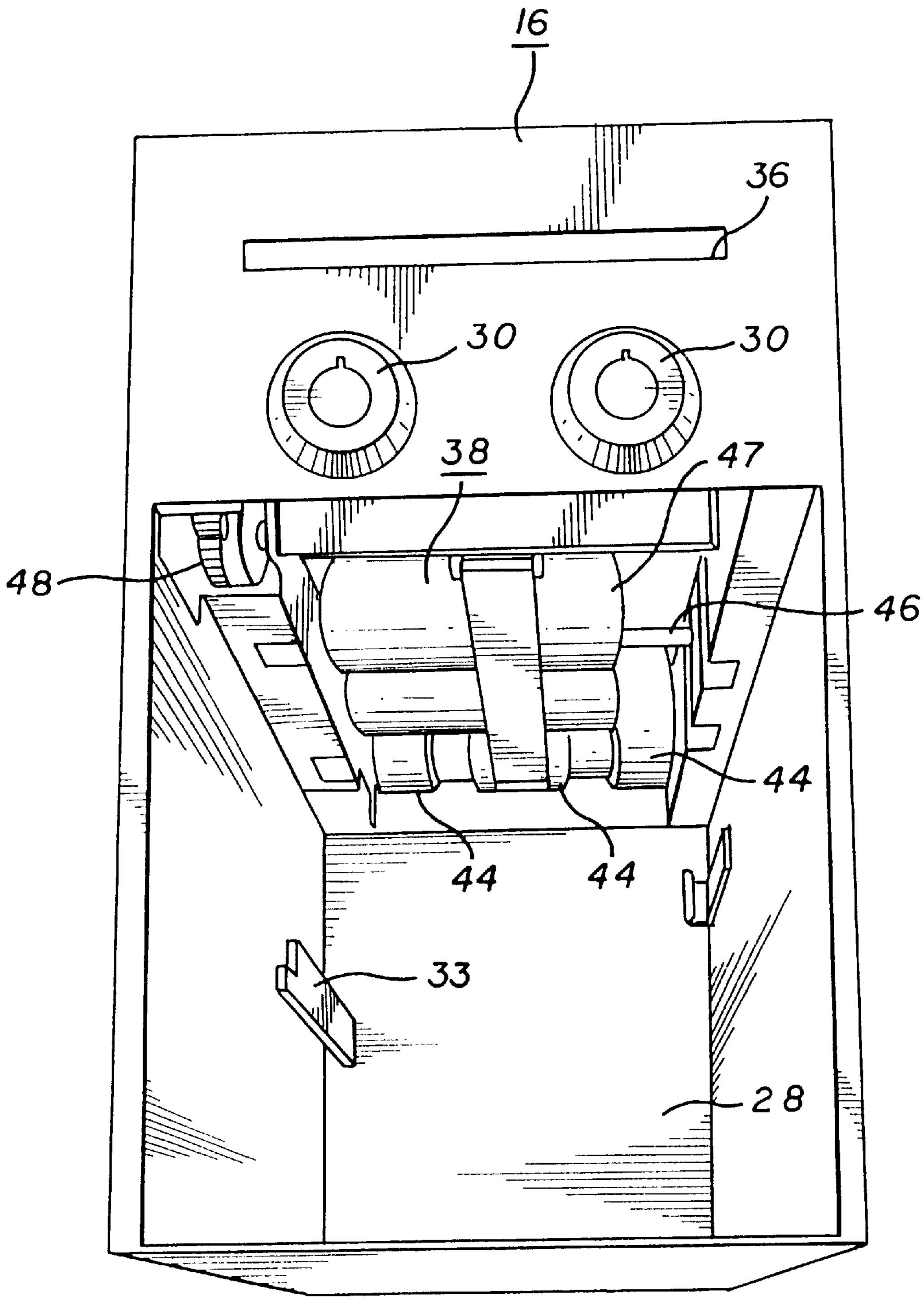
FIG. 5 is a front perspective view of a hopper without a cassette installed therein, in accordance with the present invention.
Figure 9:
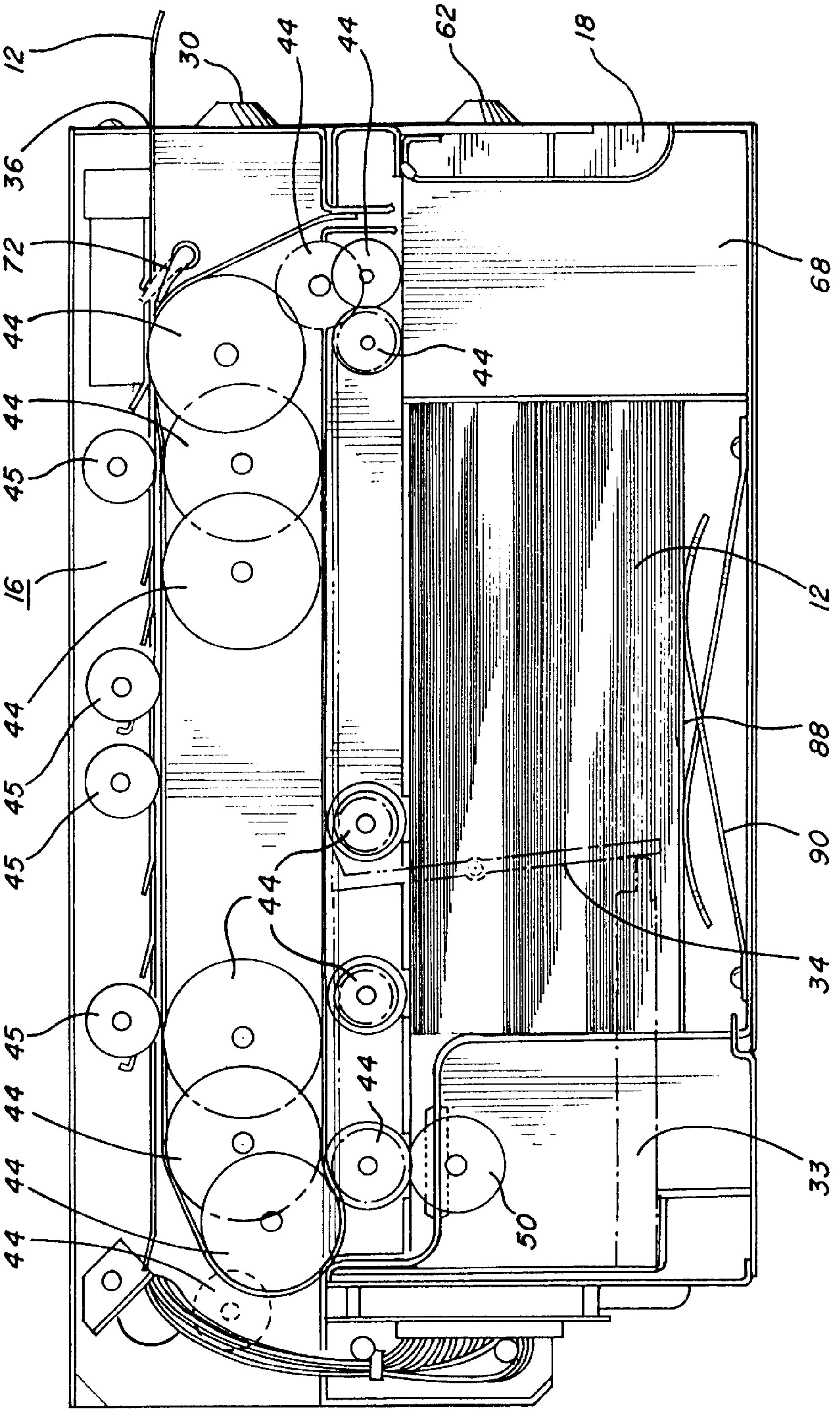
FIG. 9 is a partly-sectional elevational view of a hopper, and a cassette installed therein wherein paper tokens have been dispensed therefrom, in accordance with the present invention.

As illustrated in FIG. 5, the hopper 16 further includes a compartment 28 from which the cassette 18 may be installed or removed. Referring to FIG. 3, the hopper 16 also includes locks 30, operable by keys 32, for locking and unlocking the cassette 18 relative to the hopper 16. There are preferably one or two locks 30 operable by one or two keys 32 for the hopper 16. In the one lock configuration, for example, the lock may be offset from center in one of the two locations of each lock in the two lock configuration. As shown in FIGS. 5 and 9, upon insertion of the cassette 18 into the hopper compartment 28, a locking bar 33 in the hopper 16 causes a rod 34 to pivot and disengage from locking engagement with a transport mechanism in the cassette 18, enabling the transport of the paper tokens 12 from the cassette 18 for the dispensing thereof.

Figure 2:
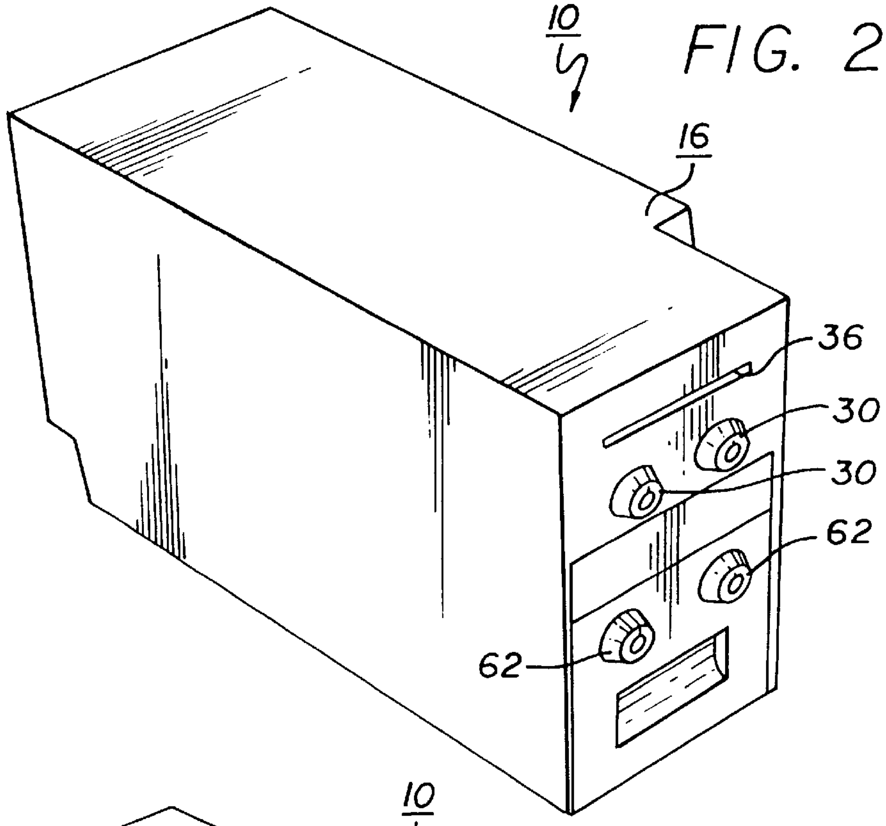
FIG. 2 is a perspective view of the hopper and the cassette installed and locked therein, in accordance with the present invention.
Figure 4:
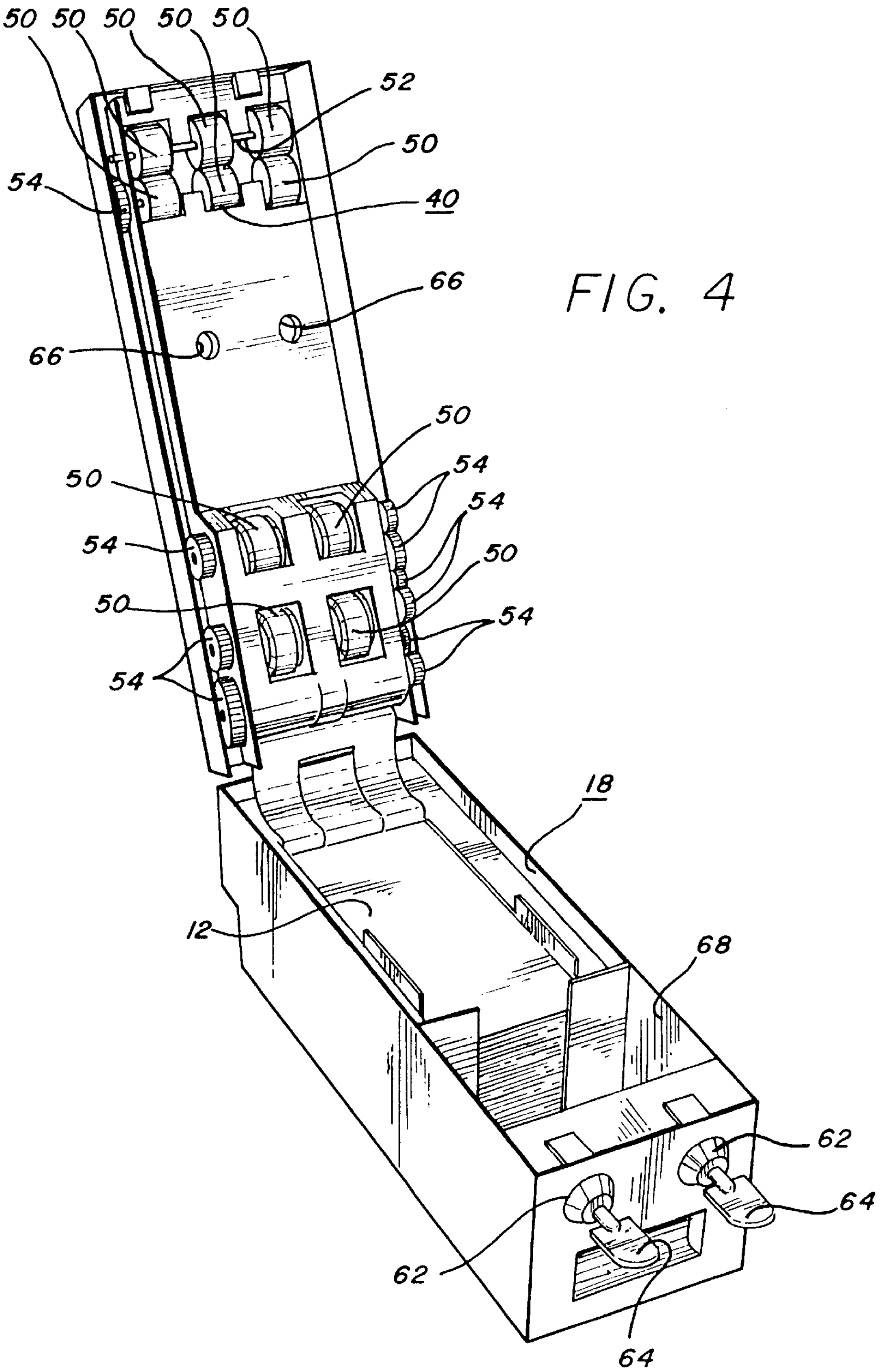
FIG. 4 is a perspective view of an unlocked cassette with the cover open and with paper tokens inserted therein.
Figure 8:
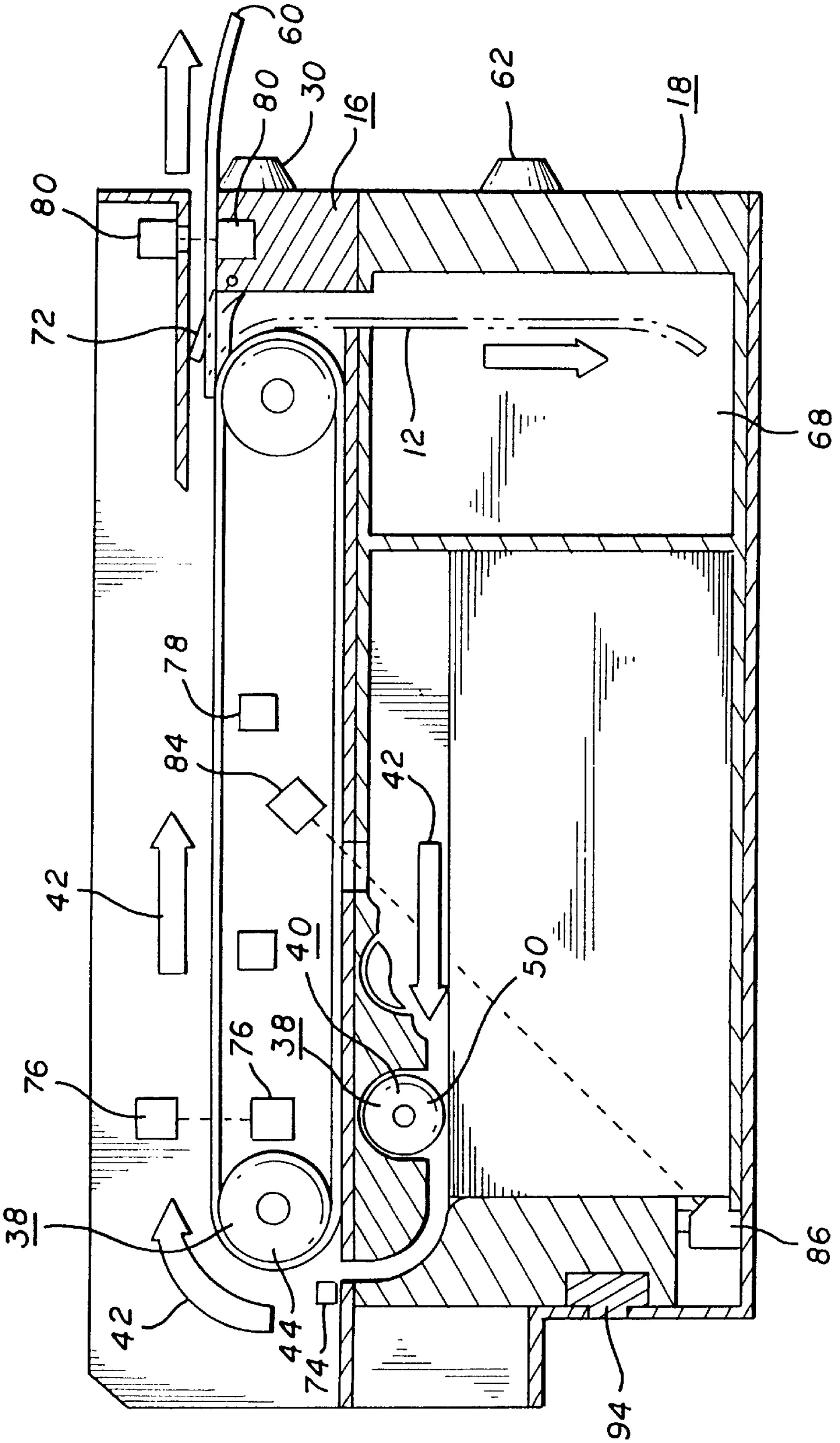
FIG. 8 is a partly-sectional elevational view of a hopper and a cassette installed therein, filled with paper tokens, illustrating the path of transporting, dispensing, and escrowing paper tokens.

As seen in FIG. 2, the hopper 16 still further includes a slot 36, through which each paper token 12 is dispensed. As shown in FIG. 9, the hopper 16 also includes a mechanism 38, and the cassette 18 includes a mechanism 40, which interact to transport each paper token 12 through a payout path 42 for dispensing thereof. The mechanisms 38 and 40 are adapted to transport one paper token 12 at a time through the payout path 42. As illustrated in FIG. 5, the hopper transport mechanism 38 includes a plurality of motor-driven rollers 44 rotably journalled on shafts 46, and a belt 47 extending about the rollers 44, with gears 48 mounted on ends of the shafts 46, and a plurality of non-motor-driven rollers 45. Referring to FIG. 4, the cassette transport mechanism 40 also includes a plurality of rollers 50 rotably journalled on the shafts 52 with the gears 54 mounted on the ends of the shafts 52. The motors 56 and 58, as shown in FIG. 7, are adapted to sequentially drive the gears 48 and the rollers 44 in the hopper 16, which drive the gears 54 and the rollers 50 in the cassette 18 to transport the paper tokens 12 along the payout path 42 from the cassette 18 through the hopper 16 as shown in FIG. 8. In accordance with the present invention, it should be noted that one of the gears 54 moves in one direction only, and locks if an attempt is made to obtain unauthorized access into the cassette 18.

The hopper 16 is adapted to dispense one paper token 12 at a time, and to delay dispensing a further paper token 12 until a dispensed paper token 12 projecting through the slot 36 is removed. In the present invention, as shown in FIGS. 8–9, the hopper 16 is further adapted to dispense each paper token 12, which includes a short side 60, such that the short side 60 is dispensed first. The gaming machine 14 may further include a dispenser for dispensing coin tokens, such that coin tokens may be dispensed in the event that paper tokens 12 run out during a payout. The coin tokens may have a value different from the value of the paper tokens.

The cassette 18 is adapted to be filled with a minimum number of the paper tokens 12, as for example and not by way of limitation 400, and, upon being filled with the paper tokens 12, may be locked so as to prevent access into the cassette 18, as by locking the locks 62 with the keys 64. Again, there are preferably one or two locks 30 operable by one or two keys 32 for the hopper 16. Also again, in the one lock configuration, for example, the lock may be offset from center in one of the two locations of each lock in the two lock configuration. However, it will be appreciated by one of ordinary skill in the art that any number of locks 30 or 62 may be used. Also, the locks and keys may be replaced with a rotating dial or knob connected to the lock cam, where a decreased level of security is acceptable.

In accordance with the present invention, the cassette 18 may further include elements adapted to enable a person, after locking of the cassette 18, to determine the denomination of the paper tokens 12 therein, wherein the paper tokens 12 comprise a plurality of bills of the same denomination, so as to determine and verify the denomination of bills in the cassette 18. As shown in FIGS. 3 and 4, such elements may comprise openings 66 in the cassette 18, which are adapted to be positioned and sized so as to enable observation of the denomination of the paper tokens 12 while preventing pulling of the paper tokens 12 out of the cassette 18. Alternatively, for example, the cassette 18 may be color coded, with a color which represents the denomination of bills contained therein, such as, by way of example only, red for 5s, green for 20s, or black for 100s. Also, the cassette 18 may be manually labeled with any type of indicia such as a number or a bar code.

As depicted in FIG. 8, the cassette 18 further includes an escrow area 68 to which rejected paper tokens 12, such as bills stuck together or damaged bills, may be diverted and stored. As shown in FIGS. 6, 8 and 9, in accordance with the present invention, the cassette 18 further includes a mechanism 70 for actuating diverters 72 for diverting rejected paper tokens 12 to the escrow area 68. The mechanism 70 comprises a solenoid actuated diverter.

For the cassette 18 and the hopper 16 to be operational, the denomination value of the paper tokens 12 in the cassette 18 is monitored under the operational control of the software, such that only a cassette 18 with a denomination value matched with a hopper 16 will be able to operate. If there is a mismatch, the hopper 16 will be disabled.

In another system (not shown) for monitoring the matching of the denomination value of the paper tokens 12, the cassette 18 may include a series of holes in the back wall thereof, and the hopper 16 may include a matching series of pins in the back wall thereof, which line up with the holes in the cassette 18. The pattern of pins in the hopper 16 must match the pattern of holes in the cassette 18 to enable the cassette 18 to be properly inserted in the hopper 16. If there is no matching hole in the cassette 18 for a pin in the hopper 16, the cassette 18 will not be able to be fully inserted into the hopper 16. Alternatively, the pins and the holes may be on separate metal plates adapted to be attached to the hopper 16 and the cassette 18, which would enable convenient and efficient changes in the denomination value for the cassette 18 and the hopper 16.

In the present invention, as shown particularly in FIG. 8, the hopper 16 and the cassette 18 further include a plurality of sensors for sensing various functions in the operation of the hopper and the cassette. The plurality of sensors, which may comprise, for example, optical sensors, include a sensor 74 proximate the beginning of the payout path 42, for sensing that a paper token 12 is in the cassette transport mechanism 40 and out of the cassette 18. The sensors 76 comprise optical detectors which measure the optical transmission characteristics of the paper token 12 to determine if it constitutes more than one paper token 12 or a damaged paper token 12. If so, the sensors 76 send a signal which activates the diverter actuating mechanism 70 and the diverters 72 to divert the selected paper token 12 into the escrow section 68. A sensor 78 senses that a paper token 12 has reached proximate the middle of the hopper 16. The sensors 80 proximate the end of the payout path 42 sense that a paper token 12 has reached the end of the hopper 16, that is, it projects through the slot 36, and also detects when a player has removed the paper token 12 therefrom. In addition, sensors are mounted on elements for flagging the condition of the motors 56 and 58, as shown in FIG. 7. For instance, the sensors monitor whether the motors 56 and 58 are running, the length of time the motors 56 and 58 have been running, and whether the motors 56 and 58 are running slowly, which also enables the sensors to measure the length of the payout tokens 12 being dispensed.

In accordance with the present invention, a sensor 84 projects an optical beam across and diagonal to the paper tokens 12 stored in the cassette 18, to determine when the cassette 18 is empty. This is accomplished such that the optical beam projected by sensor 84 is not detected by the sensor 86 until the paper tokens 12 stored in the cassette 18 are depleted. The sensor 86 is also used to detect a “low condition” of the paper tokens 12 stored in the cassette 18. This occurs as more of the optical beam projected by sensor 84 is received by sensor 86 as the paper tokens 12 are dispensed from the cassette 18.

As shown in FIG. 9, a mechanical flag may be connected to and operable with a tray 88 which supports the paper tokens 12. The tray 88 is biased by a spring 90 to be movable upwardly as the paper tokens 12 are dispensed, and activates a sensor upon low condition of the paper tokens to indicate such condition. Signal states in the system 10 are adapted such that a failed or disconnected sensor will result in a “tilt” or non-operational condition.

In accordance with the present invention, as shown in FIG. 8, the cassette 18 further includes a memory device 94 which is adapted to connect with a mating connection (not shown) in the hopper 16 upon installing the cassette 18 in the hopper 16. The memory device 94 may be located on the cassette 18 at a location where electrical connection to the hopper 16 may be effected by sliding the cassette 18 into the hopper 16, such as for example in the back of the cassette 18. The mating hopper connector may comprise, for example, three pin connectors projecting from a plate in the back of the hopper 16. The memory device 94 is adapted to store data for general purposes including game operations and casino accounting. The memory device 94 may comprise, by way of example and not by way of limitation, a button cell, for example a button interface referred to as the 128 byte version of button memory which is supplied by MacSena, Inc. of Bend, Oreg., which has one connection for both signal and power, a battery-backed RAM, or an EEPROM, which may be connected by conventional connectors, for enabling information to be stored in memory therein.

Game operations and accounting information adapted to be stored in the memory device 94 include, for example: (1) an identifier for each particular cassette 18; (2) an identifier for each particular gaming machine 14 in which a cassette 18 may be installed; (3) the number of the paper tokens 12 that have been diverted to the escrow area 68; (4) the denomination of the paper tokens 12 in the cassette 18; (5) the number of the paper tokens 12 loaded in the cassette 18; (6) the number of the paper tokens 12 dispensed by the hopper 16, such number being incremented each time a paper token 12 is dispensed by the hopper 16; (7) the number of the paper tokens 12 dispensed by the hopper 16 during a non-payout of the paper tokens 12, such as during testing and maintenance of the gaming machine 14; (8) the date and time of installation of the hopper 16 in a gaming machine 14; (9) the date and time of filling the cassette 18 with the paper tokens 12; (10) an identifier, particular to each person authorized to access the hopper 16 or the cassette 18, to show the person last accessing the cassette 18; and (11) a data integrity check for insuring the integrity of the stored information. In addition, an element for indicating that the memory device 94 is being used and is valid may be provided by a value stored in a particular memory location.

In particular and in accordance with the present invention, data adapted to be stored in the memory of the memory device 94 includes an identifier for the cassette 18, which, once assigned, for example, may be permanent, such as date stored in a ROM, or which may be a value stored in RAM that, once set, would be expected not to be changed. This cassette identifier is assigned by a docking station (not shown). Also stored in the memory device 94 is the identifier for the gaming machine 14 and the date and time of installation of the cassette 18 into the hopper 16. This identifies the gaming machine 14 in which the cassette 18 is first installed after being filled with the paper tokens 12. The date and time of installation of the cassette 18 may be downloaded to the gaming machine 14 from the central monitoring system to insure a synchronized date and time. The memory device 94 also stores the denomination of the paper tokens 12 in the cassette 18, the fill count and a fill date for the paper tokens 12 in the cassette 18, and when each cassette 18 is refilled. In addition the memory device 94 maintains a count of the paper tokens 12 dispensed from the cassette 18, a count of the paper tokens 12 dispensed from the cassette 18 during testing, a count of the paper tokens 12 in the escrow area 68 (reflecting the number of the paper tokens 12 rejected by the hopper 16) and the values of a cyclic redundancy check (an error detection method involving the division of a data stream by a polynomial, reset at fill time and kept current according to the activity of the cassette 18 in the hopper 16 of the gaming machine 14).

The gaming machine 14 may further include a memory element for storing information therein. In accordance with the present invention such information may comprise, for example, the denomination of the paper tokens 12 to be installed in the gaming machine 14. The gaming machine 14 may also include an element for comparing the denomination of the paper tokens 12 in the memory device 94 of the cassette 18 with the denomination of the paper tokens 12 stored in the memory element in the gaming machine 14. Should a mismatch be detected, a signal is sent to alert casino personnel. The gaming machine 14 may further include an element for inhibiting operation thereof when the comparing element determines that the denomination of the paper tokens 12 stored in the memory device 94 of the cassette 18 and in the memory element in the gaming machine 14 do not match. The gaming machine 14 may also include an element therein for generating a running count of the paper tokens 12 remaining in the cassette 18, and a visual indicator thereon for indicating that the paper tokens 12 in the cassette 18 are at or below a preset level responsive to the running count generated. There is also a message sending device therein for sending a message to a central monitoring system to the same effect. Moreover, the gaming machine 14 may include an element for checking the operability of the hopper 16 upon installation of the hopper 16 into the gaming machine 14. The gaming machine 14 may also include an element for generating an alarm if an unauthorized person is found installing or removing the hopper 16.

In the present invention, in a system 10 which includes a central monitoring system, wherein each gaming machine 14 may include a device for communicating with the central monitoring system. The communicating device may be adapted to send a signal or message to the central monitoring system relating to a security or accounting function of the gaming machine 14. The message may comprise, for example: the unique identifiers of the cassette 18 and the gaming machine 14 in which the cassette 18 is installed; that the hopper 16 is about to dispense a paper token 12, that a paper token has or has not been dispensed or in the alternative, the number of paper tokens 12 to be dispensed by the hopper 16 for each payout; that the hopper 16 has been installed or removed from the gaming machine 14; that the cassette 16 continued to dispense the paper tokens 12 to a player after paying out to the player the appropriate number of the paper tokens 12 that should have been dispensed in a payout; or that the hopper 16 has been prevented from dispensing a paper token. After sending a message to the central monitoring system that a payout of the paper token 12 is to start, the hopper 16 may further include an element for delaying the payout of a paper token 12 for a period of time, such as about one second, for the central monitoring system to decide upon and take any action which is necessary. Also, the central monitoring system may include a device for communicating with each of the plurality of gaming machines 14, for providing instructions thereto.

In particular, messages are sent, in accordance with the present invention, wherein the house protocol for the gaming machine 14 regarding the memory in the memory device 94 is such that the gaming machine will determine the status of the memory in the memory device 94 and will communicate that information by sending messages to the house accounting system using standard protocols. A message is sent when a cassette 18 is inserted into the hopper 16 in the gaming machine 14, and the memory in the memory device 94 is verified. A message is also sent at the start of the operation of dispensing a paper token 12, when the motor is first turned on for a payout, or when an attendant pay is required, including attempts to dispense a paper token 12 during testing. A message is also sent when the gaming machine 14 detects that the cassette 18 has been removed. A message is sent whenever a paper token 12 is presented to the player or operator, having been successfully dispensed. A message is sent whenever the gaming machine 14 determines that the cassette 18 does not have any more paper tokens 12, that is, when the internally calculated count of the remaining paper tokens is zero. A message is also sent when a cassette 18 is inserted into the hopper 16 in the gaming machine 14, and the cyclic redundancy check of the cassette 16 does not match the cyclic redundancy check calculated by the gaming machine 14. A message is sent whenever the gaming machine 14 determines that the hopper 16 is running after it should have been shut off, in that the dispensed signal continues to appear or appears without cause, which results in the lockup condition for the gaming machine 14. A message is sent when the gaming machine 14 detects a loss of the signal that the hopper 16 is present. A message is sent when a cassette 18 is inserted into the hopper 16 in the gaming machine 14 and the docking station flag is set, and the identifier of the gaming machine 14 in the cassette is not zero and does not match the identifier of the gaming machine 14. A message is sent when the gaming machine 14 determines that a paper token 12 is jammed or misfeeding, thereby preventing the hopper 16 from dispensing paper tokens 12, in that the dispensed signal stays active, whereupon the hopper 16 is disabled. A message is sent whenever the gaming machine 14 detects a signal from the hopper 16 that a paper token 12 is rejected. A message is sent when a paper token 12 is dispensed and the gaming machine 14 determines that the number of paper tokens 12 left in the cassette 18 is equal to the low limit for paper tokens 12, or the gaming machine 14 determines that the number of paper tokens 12 left in the cassette 18 is equal to or less than the low limit for paper tokens 12. A message is sent in response to a "meter request" message from the host, and, in the case where the memory in the memory device 94 is not addressable at the time of the meter request, all data in this field will be returned as zero. A message is sent when a cassette 18 is inserted into the hopper 16 in the gaming machine 14 and the denomination in the gaming machine 14 of paper tokens 12 does not match the denomination set in the cassette 18 based on the logic defined for docking station operation. If the hopper 16 has bills or script, a jammed or empty message is sent, and the gaming machine 14 continues operation by attempting to pay the remaining payout from a coin hopper. If the hopper 16 has coupons, if a jam or empty occurs, a message is sent and the operation of the gaming machine 14 is halted until the hopper 16 is filled or unjammed. This is so since the gaming machine 14 does not know the value of the coupon, and therefore must stop operation and award the player the coupon.

In accordance with the present invention, other messages may also be sent from the central system to the gaming machine 14. A message may be sent by the house system to disable the hopper 16 or to re-enable it remotely when it is otherwise operational. A message may be sent whenever the house system wants the values stored in the memory in the memory device 94, which information can be requested for periodic monitoring, house-to-game reconciliation, or to confirm a previously sent error message.

The system 10 of the present invention may further include devices for monitoring security and accounting functions of the gaming machines 14, in response to signals or messages received from the gaming machine 14. The monitoring devices may include for example, videocameras focused on the gaming machine, monitoring the gaming machine 14, for example, when a message has not been received from the gaming machine 14 that a paper token 12 has been dispensed within a specified period of time after receipt of a message from the gaming machine 14 that dispensing of a paper token 12 is about to begin; when the cassette 18 does not have any paper tokens 12 remaining therein; when the actual dispensing of the paper tokens 12 from the gaming machine 14 (for visually counting the amount of paper tokens 12 dispensed in a payout); the installation and removal of the hopper 16 relative to the gaming machine 14; or the installation and removal of the cassette 18 relative to the hopper 16.

In accordance with the present invention, the system 10 is adapted to support either a docking station mode of operation or a non-docking station mode of operation. In a docking station mode of operation, the system 10 includes a station 96 for docking the cassette 18, and the docking station 96 and the gaming machine 14 are adapted to read data from and write data to the memory in the memory device 94 of the cassette 18. In a non-docking station mode of operation, the system 10 does not include a docking station 96, and the gaming machine 14 is adapted to enable a casino operator to initially obtain data from the memory in the memory device 94 of the cassette 18, and enter data in the gaming machine 14, and to subsequently obtain data from the gaming machine 14.

Initially, a docking station flag, comprising a value to indicate whether the system 10 does or does not include a docking station 96, is set in the memory in the memory device 94 in the cassette 18. The docking station flag, for example, may comprise a value of zero as a default value to indicate that the system 10 does not include a docking station 96, or a value of one to indicate that the system 10 does include a docking station 96.

Figure 10:
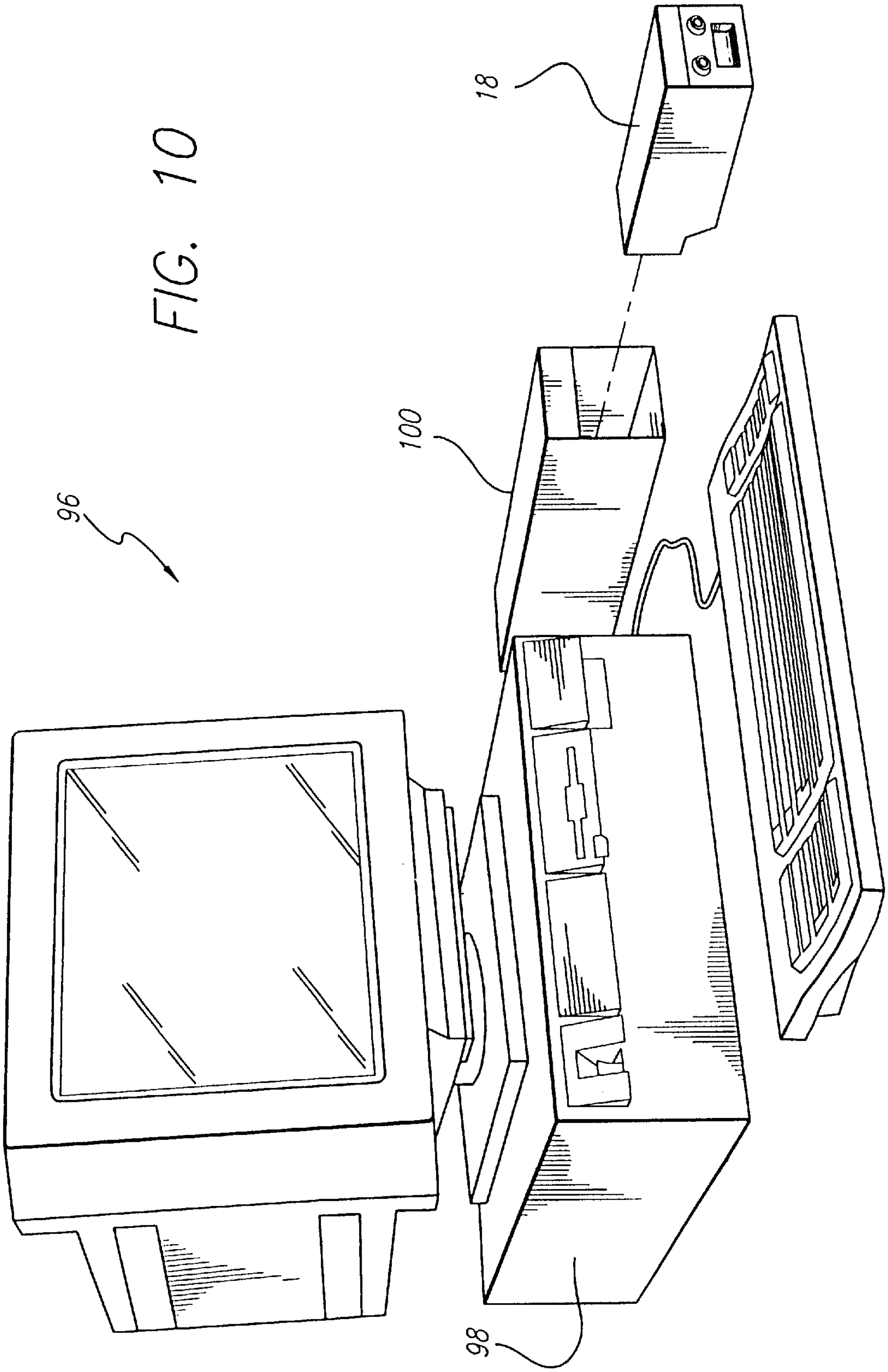
FIG. 10 is diagram showing a docking station with a cassette inserted therein, in the practice of the present invention.

As shown in FIG. 10, in a docking station mode of operation, the docking station 96 may comprise for example a computer 98 or the like, such as a desktop or laptop personal computer, and a housing 100 into which the cassette 18 may be inserted, which housing 100 is connected to the computer 98. The docking station 96 is is adapted to read data from and write data to the memory in the memory device 94 in the cassette 18, for initializing the cassette 18 and for casino accounting purposes.

The docking station 96 provides the initialization, reconciliation, and filling or refilling functions required to account for the monetary value passing through the hopper 16. Further, in the docking station 96, the system software and memory interface are defined to operate to allow setup, to clear memory, to reload meters after extraction of memory from the gaming machine 14, and to initialize house accounting for fills and refills. All data written to the memory of the memory device 94 implies that the value of the cyclic redundancy check in the cassette 18 is also updated correctly.

In the docking station mode of operation, the memory in the memory device 94 may be initialized the first time the cassette 18 is connected to the docking station 96, by loading the unique identifier for the cassette 18 into the memory device 94. The memory in the memory device 94 may then be cleared of any other data therein including the denomination value of bills, the quantity of bills, and the date and time of filling. The operator may then fill the cassette 18 with paper tokens 12, for example loading in 400 twenty dollar bills. Then, the operator may program the values into the memory in the memory device 94 in cassette 18 at the docking station 96 terminal, including the denomination value of the bills which is twenty dollar bills, the quantity of bills which is 400, and the date and time of filling. All other memories are cleared out, except a cyclic redundancy check which is updated.

The cassette 18 may then be removed from the docking station 96, installed in a hopper 16, and then installed in a gaming machine 14. When the cassette 18 is inserted into a gaming machine 14, a game cassette memory communication interface is established. The gaming machine 14 then verifies the memory in the memory device 94 by reading all the data in the memory and verifying the cyclic redundancy check value. If the cyclic redundancy check value is found to be invalid, the gaming machine 14 sends an error message to the host and disables further operations of the hopper 16. Otherwise, the installation process continues.

The gaming machine 14 then reads the docking station flag from the memory device. If the docking station flag is set to indicate that the system 10 does include a docking station 96, the gaming machine 14 will support the operation of the memory device 94. The identifier of the gaming machine 14 is then read from the memory in the memory device 94. If the value of the identifier is zero, the identifier of the gaming machine 14 is written to the memory device 94 when the cassette 18 is accepted by the gaming machine 14. If the value of the identifier is equal to the identifier of the gaming machine 14, the gaming machine continues the acceptance process. If the value of the identifier is not zero and is not equal to the identifier of the gaming machine 14, the cassette 18 is not accepted by the gaming machine. This will cause the hopper 16 to be disabled and an error message will be sent to the host. The gaming machine 14 also reads the denomination of the paper tokens 12 from the memory of the memory device 94. If the denomination of the paper tokens 12 does not match the denomination set in the gaming machine 14, an error message of a denomination mismatch is sent to the central system, and the hopper 16 is disabled. If the docking station flag is set, the identifier for the gaming machine 14 is zero, and if the cyclic redundancy check is valid, the identifier of the gaming machine 14 and the date of installation of the cassette 18 are written to the memory of the memory device 94. In addition, the fill count of the paper tokens 12 is transferred to the gaming machine 14, and the gaming machine image of the memory device 94 is verified.

After installation and verification of the cassette 18 in the gaming machine 14, play of the game may proceed. Then, each time an event takes place in the gaming machine 14 which relates to the paper tokens 12, an appropriate meter in the gaming machine 14 is incremented, and a value is written in the memory of the memory device 94. If a player wins the game, the gaming machine 14 dispenses the payout of the paper tokens 12, and loads in its internal counters, and writes in the memory device 94, the value of the count of the paper tokens 12 dispensed. If there is a double feed of the paper tokens 12, that is detected, the double-fed paper coupons 12 are diverted into the escrow area 68, and the gaming machine 14 increments the count of the paper tokens 12 in the escrow area by the default value of two, decrements the count of the paper tokens 12 remaining in the cassette 18 by the default value of two, and the value is written in the memory device 94. If a test is run to diagnose any problems in the gaming machine 14, the count of the paper tokens 12 dispensed during testing is updated, and the value is written in the memory device 94. If the count of the paper tokens 12 remaining is below a set number, such as twenty, the gaming machine 14 sends a message to the central system that the paper tokens 12 are low. Then the cassette 18 in the gaming machine 14 is removed, a new cassette 18 filled with the paper tokens 12 is installed in the gaming machine 14, and the process in the gaming machine 14 starts over again.

The removed cassette 18 is then taken to the count room in the casino, and plugged into the docking station 96. The docking station 96 then reads the values in the memory device 94 and writes and stores them in the docking station 96, including the number of bills dispensed, the number of bills in escrow, the number of bills remaining, and the number of bills dispensed in test mode, and displays for the operator the number of bills which should be left in the cassette 18. The operator may then open up the cassette 18, take out the bills and count them. If everything matches, the count is reconciled.

In particular, in the docking station mode, the clearing of all memory in the memory device 94 is a one-time procedure performed with a password protected program. The docking station 96 will write and read appropriate values to each memory location in the memory device 94 to verify acceptable memory operation. A memory test failure will be alerted to the operator. If the memory test is successful, the user will be prompted to set the identifier of the cassette 18. In addition, the current date and time, to the minute, is required to designate the fill date for the cassette 18. Also, the docking station 96 flag for the cassette 18 will be set; the remaining values of the memory in the memory device 94 will be set to a pre-selected value such as zero which indicates the memory is cleared or inactive; and the calculated value of the cyclic redundancy check will be written.

The docking station 96 displays all values read from the memory of the memory device 94. The user will be given an opportunity to enter actual quantity or values of paper tokens 12 physically counted to the reconciliation data record, under the security of password protection. The user will also be prompted to store the data to hard disk and/or to print the statistics as they are presented. A reconciliation record will be created and appended to a reconciliation file for use with a spreadsheet or database reporting system. The user will be prompted to send the reconciled data to the host accounting system. The simultaneous downloading and reconciliation of multiple memories of memory devices 94 will also be provided.

The docking station 96 will then present a display screen to allow the operator to set the appropriate values in the memory device 94 when the cassette 18 is filled or refilled. The user is prompted for the denomination and fill count of the paper tokens 12 and the default values are read. The docking station 96 then writes fill count, denomination, and fill date/time of paper tokens 12; clears the identifier of the gaming machine 14, the install date, and all other counts; sets the docking station used flag; and calculates and writes the cyclic redundancy check. In addition, meter reads require the user to verify the actual count of the paper tokens 12 left in the cassette 18, and the actual count of the paper tokens 12 in the escrow area 68. Any discrepancies in the reconciliation will be documented by the docking station 96 and accompanied by a date and time stamp and user entry.

At the docking station 96 user interface, the functions available to the operator include clearing the memory, a password secured function, which includes verifying the memory; initializing the identifier of the cassette 18, with a prompted default of the previous identifier read; initializing the fill date of the cassette 18 with the current date and time; setting the docking station used flag for the cassette 18; zeroing the remaining memory storage automatically; and writing the cyclic redundancy check. Another function is the "meter read", including reading the meters; prompting for verification of the actual counts of the paper tokens 12 in the cassette 18, the paper tokens 12 in the escrow area 68, and recording the discrepancies in meter counts versus actual counts of the paper tokens 12 and the time stamp; prompting the user to store and/or print a report of the statistics; prompting the user to send data to the central accounting system; and permitting simultaneous downloading and reconciliation of multiple memories. Another function is fill or refill, including providing the ability to do the meter read function; prompting the user for the fill count and denomination count, with a default of the prior read; writing the fill count and denomination of the paper tokens 12; automatically writing the fill date and time for the cassette 18; zeroing the identifier for the gaming machine 14, the installation date, and all other counts; setting the docking station used flag; and calculating and writing the cyclic redundancy check.

In the present invention, the docking station 96 also validates all data before it is communicated to the central system, including reconciling memory data with the house system. The docking station 96 sends messages to the central system, including a message sent when a new cassette 18 is being initialized and a new identifier for the cassette 18 is required—used when all identifiers for the cassettes 18 are generated by the house system. Similarly, the house system sends messages to the docking station 96, including a message sent in response to a message requesting an identifier for the cassette 18, which returns a new identifier to be assigned to a new cassette 18. In a non-docking station mode of operation, the system 10 does not include a docking station, and each gaming machine 14 is adapted to enable a casino operator to initially obtain data from the memory in the memory device 94 in the cassette 18, and to enter the data in the gaming machine 14 upon installation of the cassette 18 in the gaming machine 14, and to subsequently obtain data from the meters in the gaming machine 14 at the time of removal of the cassette 18 from the gaming machine 14.

Initially, the denomination of the paper tokens 12 to be inserted in the gaming machine 14 is requested and displayed to the casino operator for either acceptance thereof or alteration, in a one-time setting that is performed only when the gaming 14 is installed and set up for the first time. Once accepted, operation continues Upon installation of a cassette 18 in a gaming machine 14, the gaming machine 14 is adapted to read the value of the docking station flag in the cassette 18. If the docking station flag indicates that the system 10 does not include a docking station 96, the gaming machine 14 does not read data from or write data to the memory in the memory device 94 in the cassette 18. A casino operator, may then obtain the data from the memory device 94 relating to the paper tokens 12 which have been inserted upon filling of the cassette 18 and enter the data in the gaming machine 14. The data adapted to be entered in the gaming machine 14 includes the denomination of the paper tokens 12 in the cassette 18, and the quantity of the paper tokens 12 in the cassette 18.

After installation and verification in the gaming machine 14 of the cassette 18, play of the game may proceed. Each time an event then takes place in the gaming machine 14 relating to the paper tokens 12, an appropriate meter is incremented in the gaming machine 14.

When the cassette 18 is to be removed from the gaming machine 14 and replaced by a new cassette 18 filled with the paper tokens 12, a casino operator may then obtain access to the meters in the gaming machine 14, to obtain the information from the incremented meters regarding the status of the paper tokens 12 in the cassette 18, through an appropriate access-enabling device. The access-enabling device may comprise, for example, referring to FIG. 1, a touch screen keypad (not shown) in the display 24 for a casino-type video game, or the push buttons 25 for a slot machine. The information obtained by the operator from the incremented meters includes the count of the paper tokens 12 dispensed, the count of the paper tokens 12 in the escrow area 68, and the count of the paper tokens 12 dispensed during testing. In systems 10 wherein the gaming machines 14 are connected to a central system, this information may be sent in real time to the central system. In systems 10 which wherein the gaming machines 14 are not connected to a central system, this information may be recorded by the operator, and the number of paper tokens 12 which should be left in the cassette 18 may be determined therefrom. The cassette 18 may then be removed by the operator, and the operator may then open up the cassette 18 or take the cassette 18 to the count room in the casino, and take out the bills and count them. If everything matches, the count is reconciled.

Referring now more particularly to FIGS. 11–16 of the drawings, the application of the system 10, in accordance with the present invention, and as previously shown in FIGS. 1–9, to achieve secure, reliable, and convenient dispensing, containing, and monitoring of paper tokens 12 in a gaming machine 14 through the payout controlling software is described. The payout controlling software comprehensively controls the operations of the payout of the paper tokens 12. The operations of the payout of the paper tokens 12 which may be controlled by the payout controlling software may include, by way of example only, the setup, reset, testing, maintenance, startup, payment, and monitoring operations thereof.

Figure 11:
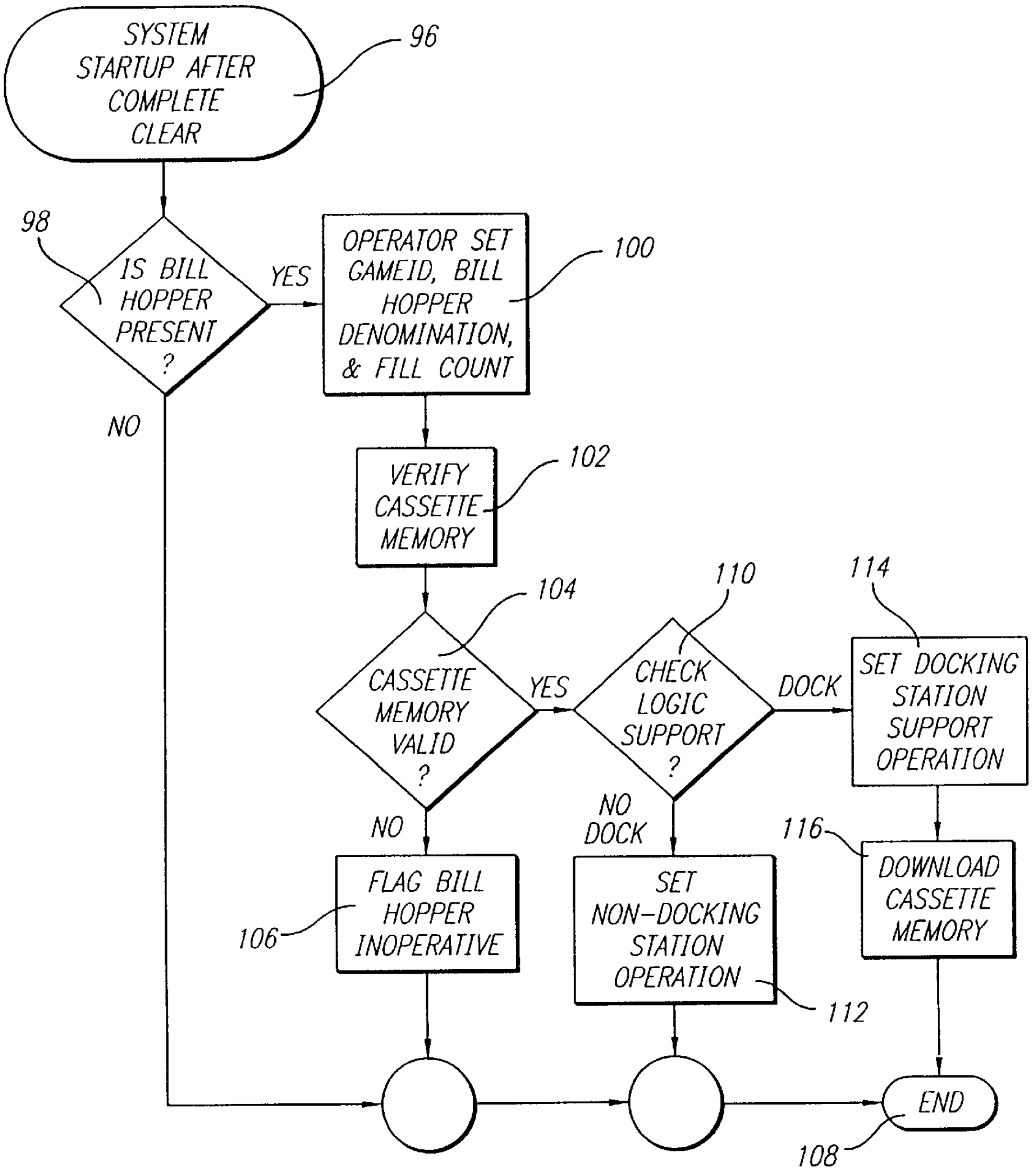
FIG. 11 is a flow chart illustrating system startup and initial processes, in accordance with the invention.

As shown in FIG. 11, upon initial machine installation, in a one-time process that is only performed on machine installation, one-time settable values and parameters are set under the control of the payout controlling software. At step 96 the system 10 will startup and complete clearing of memory in the memory device 94. The system 10 will then determine if a hopper 16 is present, at step 98. If the hopper 16 is not determined to be present, at step 98, the system 10 immediately exits at step 108. If, on the other hand, the hopper 16 is present, the operator will be prompted at step 100 to set options for the gaming machine 14 and the dispensing means for the game identifier, the denomination of the paper tokens 12 and the fill count in the hopper 16. At step 102 the memory of the memory device 94 in the cassette 18 will be verified. If the memory of the memory device 94 in the cassette 18 is found to be invalid at step 104, the hopper 16 will be considered to be inoperative at step 106, the proper messages will be sent to the host system when connected, and the routine exits at step 108. If the memory is found to be valid, however, at step 104, operation will continue at step 110.

At step 110, the memory in the memory device 94 in the cassette 18 will be checked to determine which logic support path to use for continued operation of the hopper 16. If the game determines that it will not use the memory device 94, support logic for the system 10 other than the docking station, which comprises the non-docking station, will be set and administered at step 112, and the routine exits at step 108. If the game determines that it will use the memory, docking station support logic will be set and administered at step 114. The game will download the memory and verify its options accordingly at step 116, and the routine exits at step 108.

Figure 12:
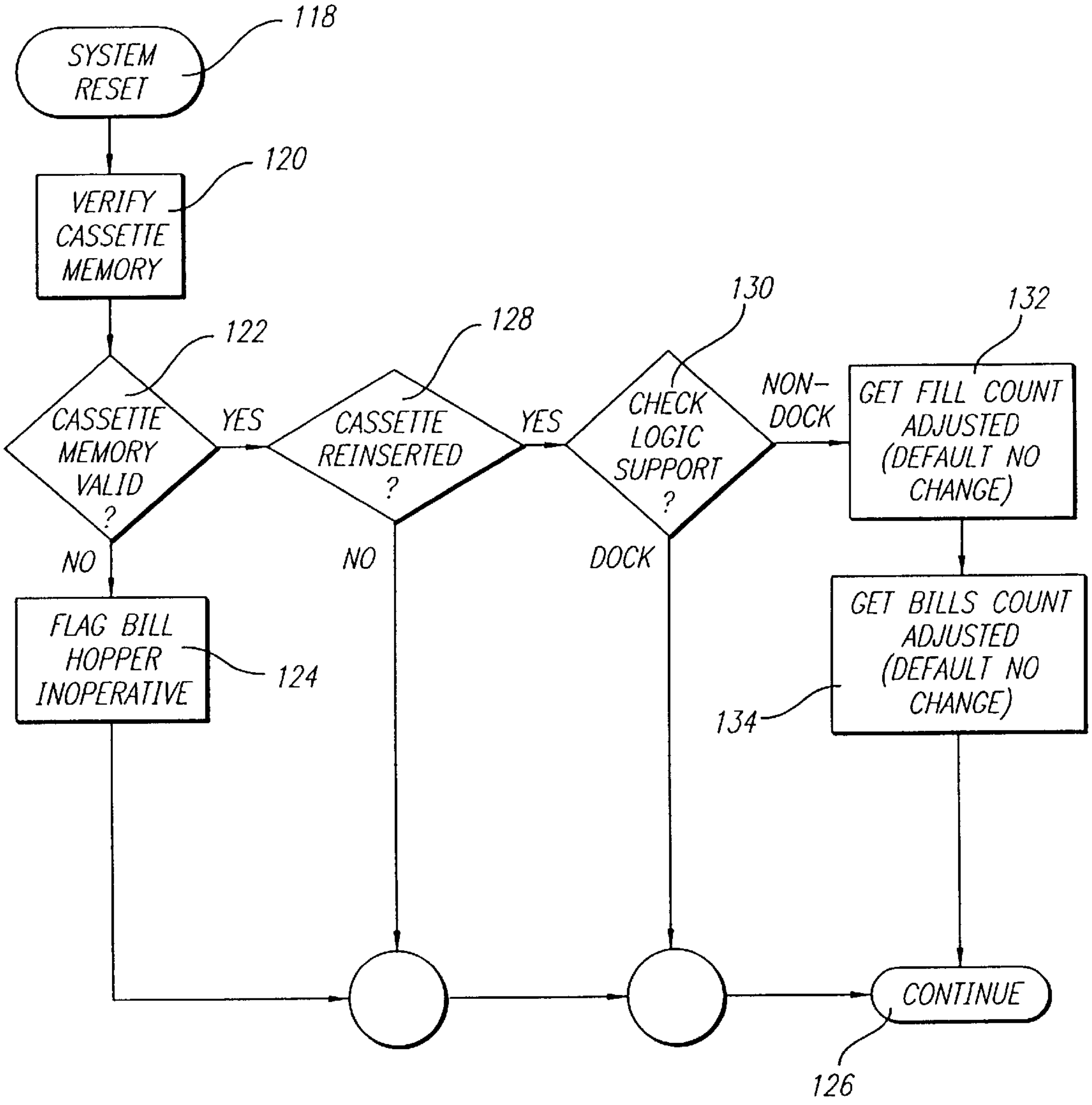
FIG. 12 is a flow chart for a system reset process, in the practice of the invention.

Referring now to FIG. 12, for system reset at step 118, the memory in the memory device 94 in the cassette 18 will be verified under the control of the payout controlling software at step 120 and, if found valid, at step 122 operation will continue. If the memory is found to be invalid at step 122, the hopper 16 will be considered to be inoperative at step 124, the hopper messages will be sent to the host system, a local "tilt" message will be displayed at the gaming machine 14, and the routine exits at step 126. If, however, the insertion of the cassette 18 is detected at step 128, for docking station support, the gaming machine 14 will automatically obtain the fill count of the hopper 16 from the memory device 94 in the cassette 18 at step 130. For non-docking station support, the operator will be prompted to set the fill amount at step 132, with a default of no change, and to change the count of paper tokens 12 in the cassette 18 at step 134, with a default of no change.

Figure 13A:
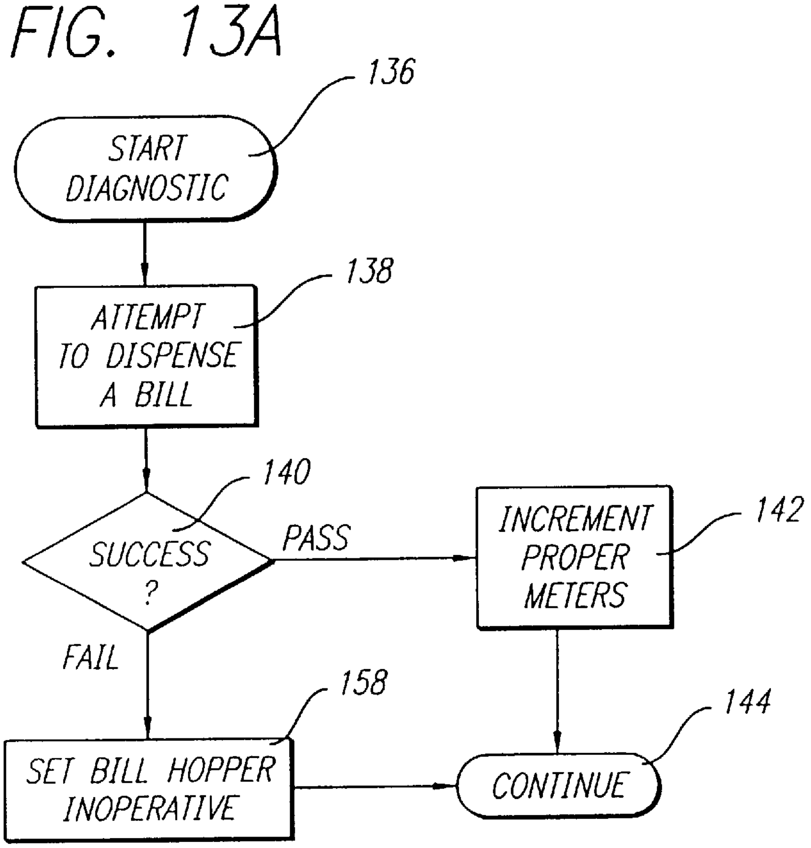
FIG. 13 is a flow chart for a non-game process, in accordance with the invention.
Figure 13B:
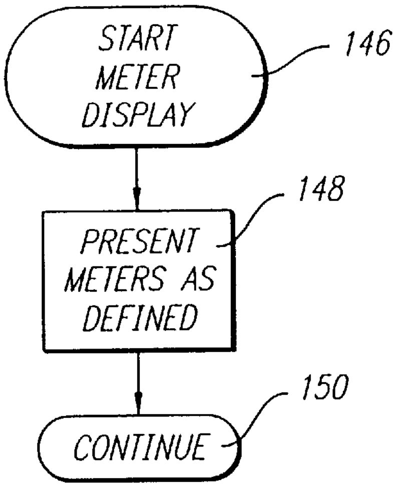
Figure 13C:
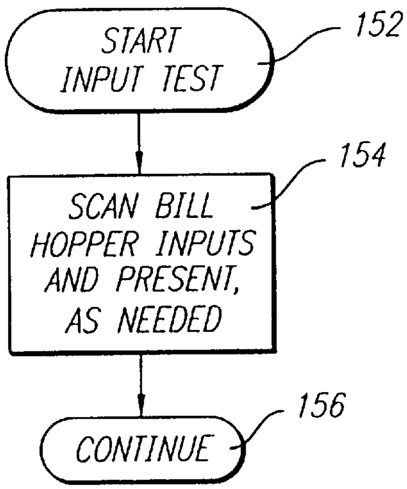

As shown in FIG. 13, for non-game operations, such as testing and maintenance, a diagnostic function will be provided under the control of the payout controlling software at step 136 to test the hopper 16 by completely dispensing a single paper token 12 at step 138. If the game senses proper operation, it will display "pass" or "fail" accordingly.

If it displays "pass", the game will treat this as a bill out test at step 142, incrementing the game test meter for the paper tokens 12 and the count of paper tokens 12 dispensed from the cassette 18. Furthermore, if the docking station support is set, the system decrements the game count of the paper tokens 12 in the cassette 18, and increments the other meters and sends signals as needed, and continues the routine at step 144 to start the meter display at step 146, and to present meters at step 148 to monitor all of the related signals. It will be appreciated that a metering group displays the game meters. The routine will then continue at step 150, to start an input test at step 152. The current status of the input signals for the hopper 16, will be displayable at step 154, such as that the hopper is installed, the cassette 18 is installed, the cassette 18 is empty, the motor is on, a paper token 12 is at the end of the payout path, and/or a paper token 12 is rejected. The routine then continues at step 156. If the game displays "fail" at step 140, the hopper 16 will be set as inoperative in step 158, and the routine continues at step 144.

Figures 1, 14:
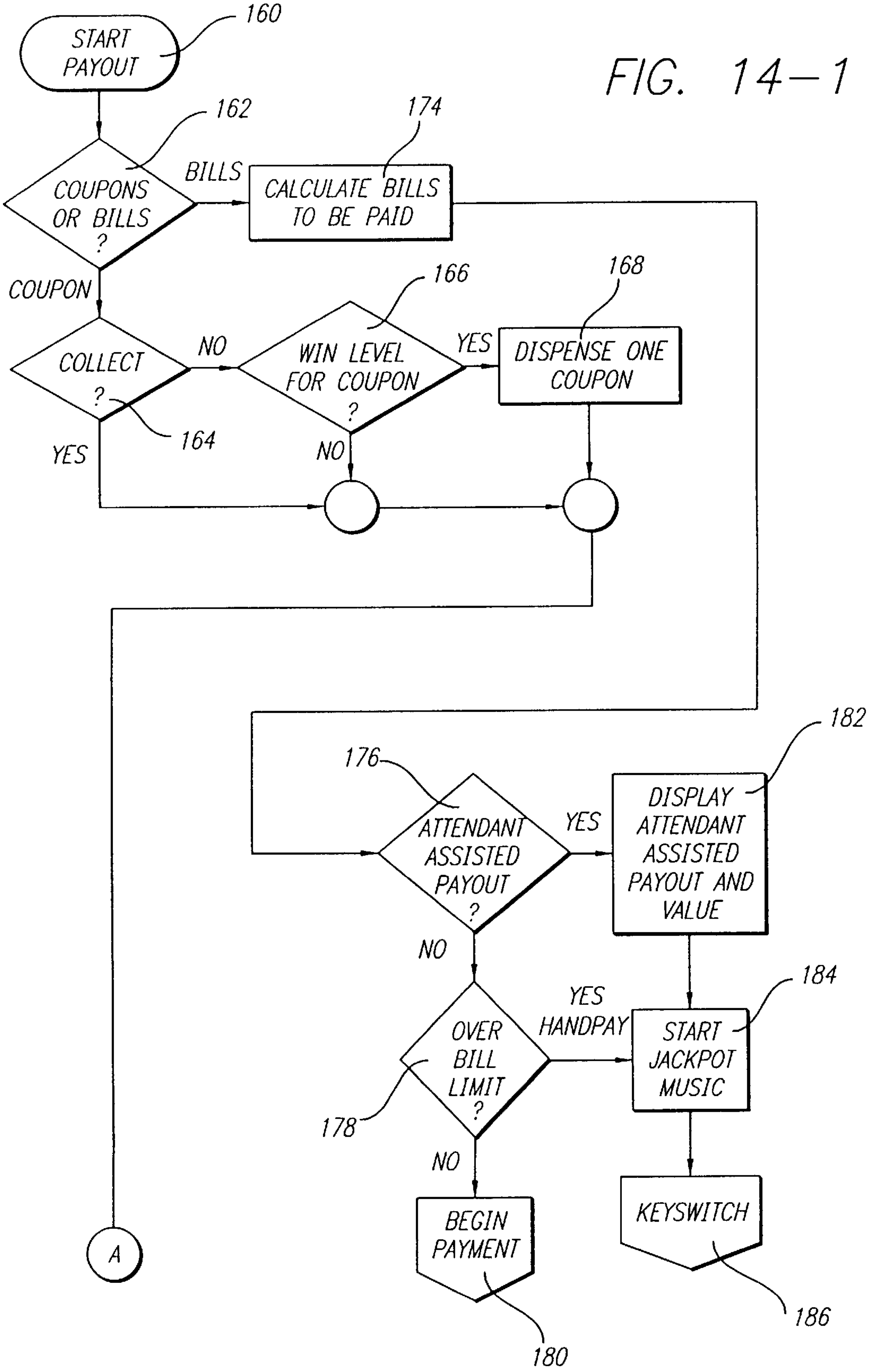
FIG. 14 is a flow chart for payout processes, in the practice of the invention.
Figures 2, 14:
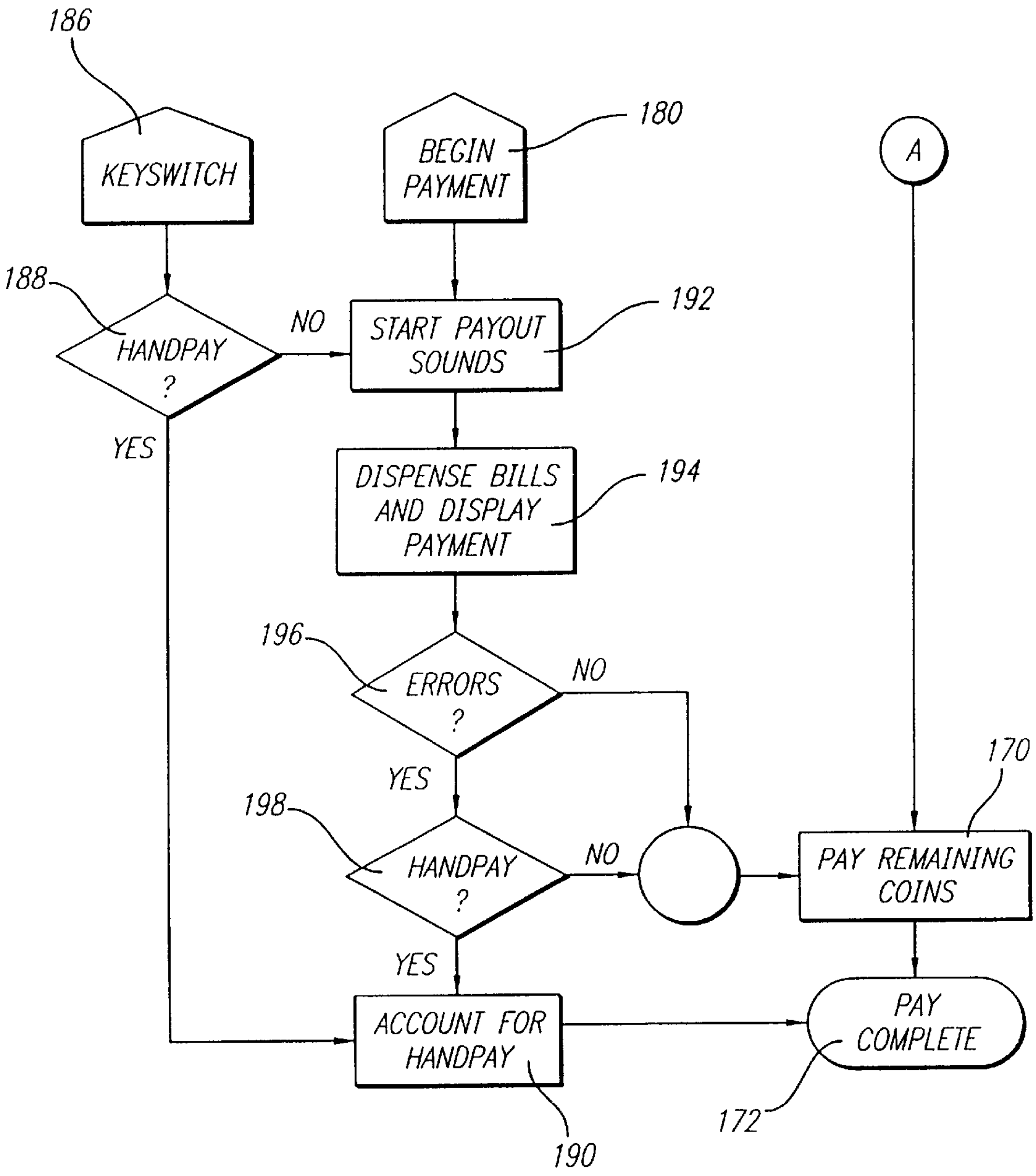

As illustrated in FIG. 14, after a win or collect lockup evaluation has been completed, when a direct payout of a win in paper tokens 12 occurs, the payout starts under the control of the payout controlling software at step 160. If the paper tokens 12 dispensed are coupons, as determined at step 162, if the payment is not a collect from a credit meter, as determined at step 164, and if the win warrants a coupon as determined at step 166, then a coupon is dispensed at step 168, error messages are properly supported and host messages are sent accordingly, any remaining payout is paid in coins, at step 170, and pay is complete, at step 172. If the payment is a collect from a credit meter, as determined at step 164, then any remaining payout is paid in coins, at step 170, and pay is complete, at step 172. If the win does not warrant a coupon, as determined at step 166, any remaining payout is paid in coins, at step 170, and pay is complete at step 172. If, on the other hand, the paper tokens 12 dispensed are not coupons but are instead bills, as determined at step 162, the number of bills to be dispensed is calculated at step 174. If no attendant assisted payment is required as determined at step 176, then whether the payout is over the bill limit is determined at step 178, and, if not, the required payment of bills begins at step 180. If an attendant assisted payout is required, as determined at step 176, then the attendant assisted payout and value are displayed at step 182, jackpot music is started at step 184, and a game timer "tower" lamp is set. Then a message is sent to the central system notifying that attendant assisted payment is required, and the value owed to the player is presented in credits along with an annotation that an attendant assisted payout is required, an audit keyswitch is then activated at step 186.

Once the keyswitch is activated, at step 186, whether the payout is by handpay is then determined at step 188. When handpay is required, as determined at step 188, the handpay is accounted for, at step 190, and pay is complete at step 172. When no handpay is required, as determined at step 188, and when payment begins at step 180, the payout sounds are started, at step 192, and the game tower lamp is cleared. The paid amount is then displayed, incremented by the value of the paper tokens 12 in credits as the paper tokens 12 are taken from the hopper 16, and the paper tokens 12 are dispensed at step 194 until the required number of bills have been dispensed. The appropriate paper tokens 12 meters are updated, such as paper tokens dispensed, paper tokens value dispensed, and paper tokens rejected. The count of the paper tokens 12 is updated in the cassette 18, and if no errors have occurred such as a misfeed, jam, or insufficient paper tokens 12, as determined at step 196, any remaining payout is paid in coins, at step 170, and payment is completed at step 172.

If an error has occurred, as determined at step 196, the game tower lamp is set to "tilt", a message is sent to the central system, and it will be determined at step 198 whether handpay is required. If there is to be no handpay, as determined at step 198, the game will return to a coin payout mode at step 170, evaluating the payout for regular lockup conditions. If the hopper 16 lockup is not set or is evaluated to be inactive, the paper tokens 12 are dispensed until the required number of paper tokens 12 have been dispensed, or an error occurs, such as a misfeed or jam, or there are insufficient paper tokens 12. The appropriate meters are updated, including paper tokens dispensed, the value of paper tokens dispensed, and paper tokens rejected, and the paper tokens 12 in the cassette 18 are counted. The remaining amount of money is paid out in coins at step 170, and pay is complete at step 172. If handpay is required, as determined at step 198, proper accounting will be performed at step 190, and the game will return to a pay completed and game over state at step 172.

Figure 15:
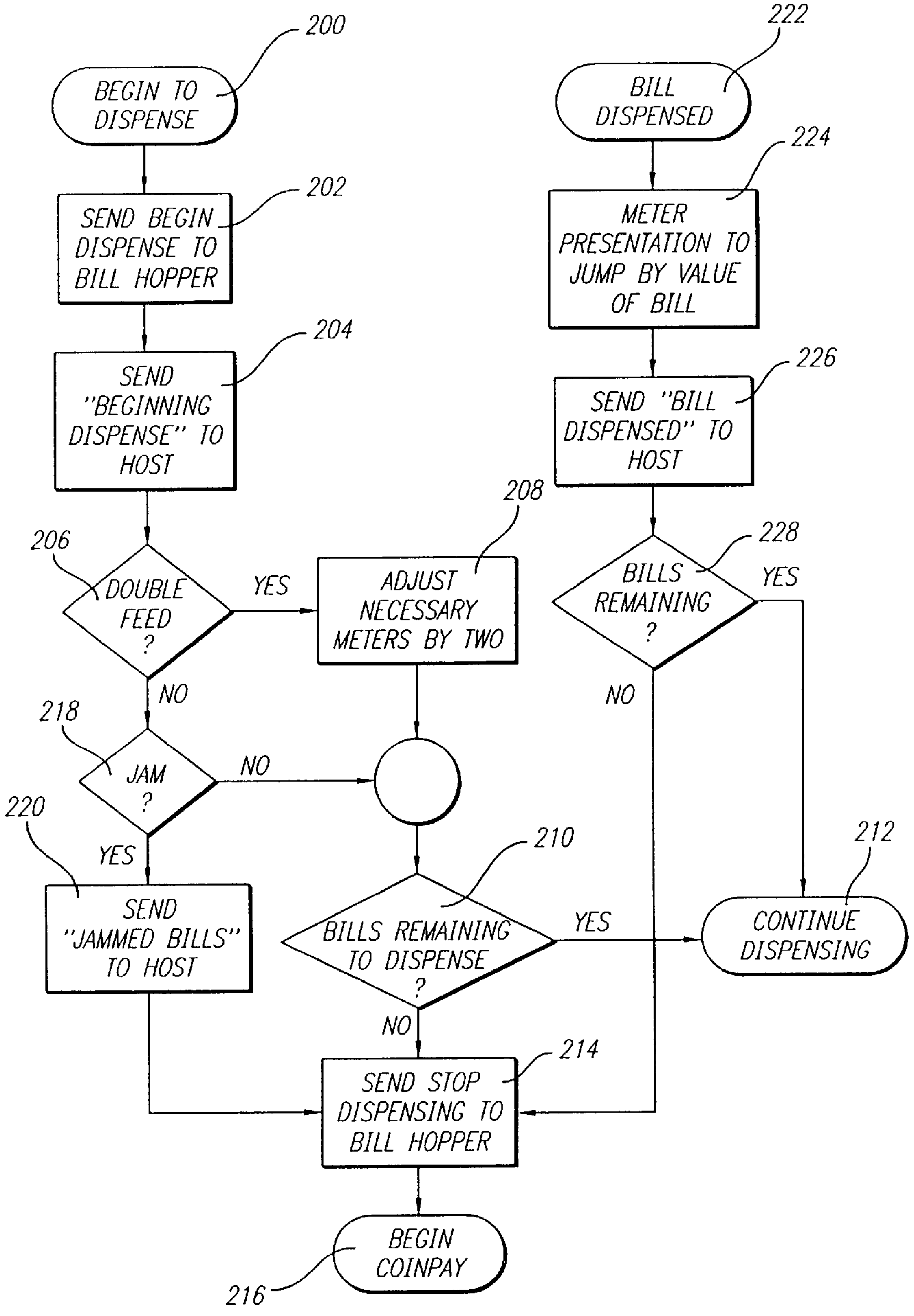
FIG. 15 is a flow chart for a paper token dispensing process, in accordance with the invention.

Referring to FIG. 15, upon beginning the operation of dispensing paper tokens 12, at step 200, an initial signal will be sent under the control of the payout controlling software comprising a "begin dispensing" signal at step 202 sent to the hopper 16, and a message that the dispensing of the paper tokens 12 is beginning is sent at step 204 to the central system, when the motor is first turned on during a payout session. If a signal is received at step 206 of paper tokens 12 which are rejected, for example such as a double feed, the count in the meters will be adjusted at step 208, including the count of paper tokens 12 in the cassette 18 which will be decreased by two. The counts for the game paper tokens rejected meter, the cassette paper tokens dispensed, and cassette paper tokens escrowed, will be increased by two. Whether there are bills remaining to dispense is then determined at step 210. If there are bills remaining, dispensing will continue at step 212; if not, the game will send a "stop dispensing" signal to the hopper 16 at step 214, and coinpay will begin at step 216. If there is no double feed, as determined at step 206, whether there is a jam will be determined at step 218. If there is a jam, as determined at step 218, that is, the jam timer expires, the game will send a "jammed paper tokens" error message at step 220, an error notification signal will be invoked, and a game tower light "tilt" indication will be activated. If there is no jam, as determined at step 218, whether there are bills remaining to be dispensed is determined at step 210. If so, dispensing will continue at step 212; if not, a "stop dispensing" signal will be sent by the game to the hopper 16 at step 214, and coin payout will begin at step 216.

For each paper token 12 that is dispensed, at step 222, the metering presentation shall appear like that of a payout from a coin hopper, except that the amounts shall increase by the value of the paper token dispensed, at step 224. A signal will be returned at step 226 to the main program and a message will be sent to the central system indicating that a paper token 12 has been dispensed. The meters for game paper tokens 12 to pay and game paper tokens 12 in the cassette 18 will be decremented, whereas the counts for the game paper tokens 12 dispensed and the paper tokens 12 dispensed from the cassette 18 will be incremented. The meter for the game value dispensed will also be increased by the value of the paper tokens 12 dispensed. If the last paper token 12 has been dispensed, as determined at step 228, a "stop" signal will be sent to the hopper 16, at step 214; otherwise dispensing will continue at step 212. If there are no paper tokens 12 remaining to dispense, a "stop dispensing" signal is sent to hopper 16, at step 214, and coin payment begins at step 216.

Figure 16:
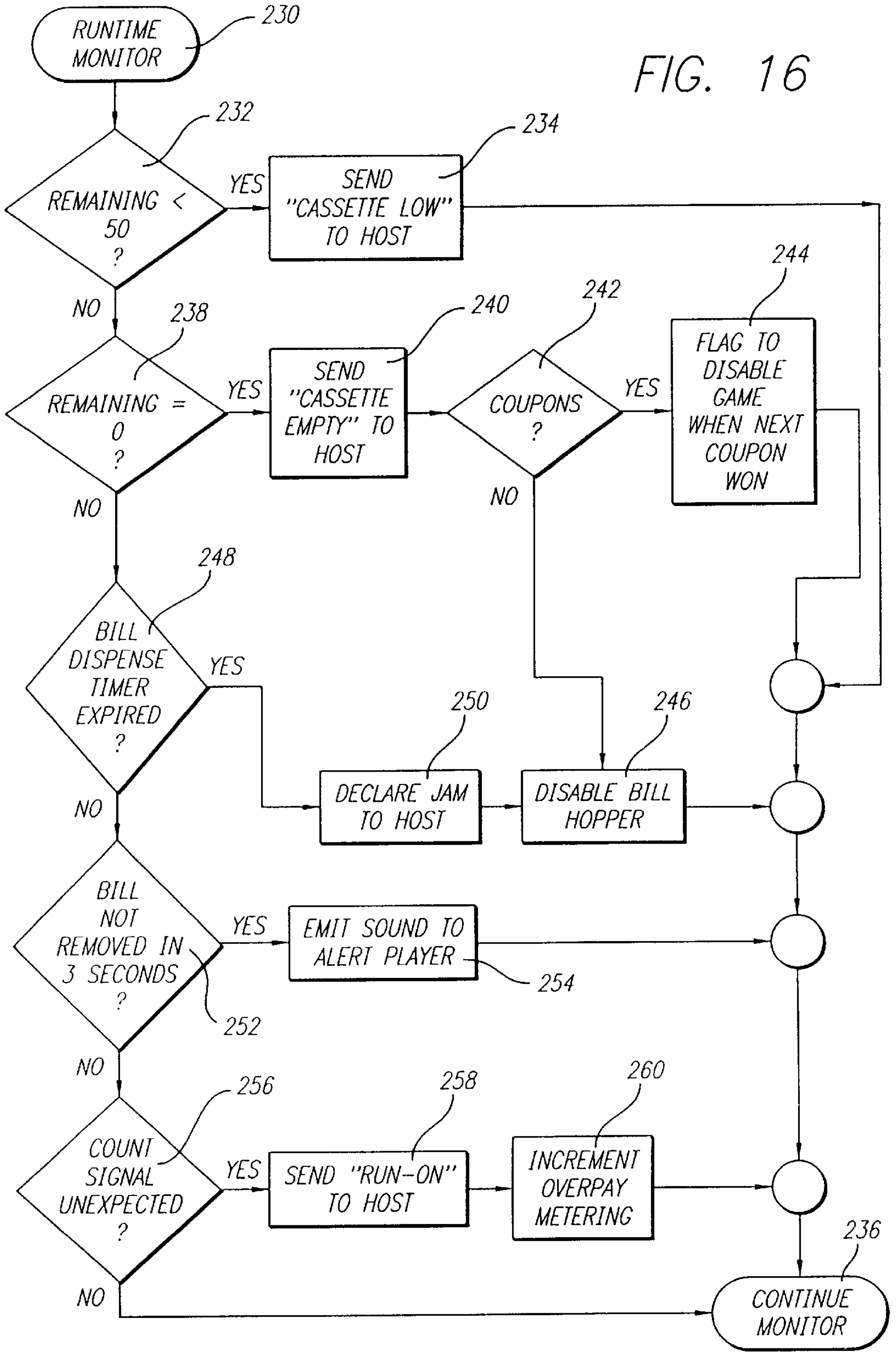
FIG. 16 is a flow chart for monitoring of conditions and responses, in the practices of the invention.

As shown in FIG. 16, monitoring of conditions and responses at step 230 includes determining at step 232 under the control of the payout controlling software whether the count of paper tokens 12 remaining in the cassette 18 has dropped to a preset value, such as 50, whereupon a "cassette low" message will be generated at step 234, and monitoring will continue at step 236. If the count of paper tokens 12 left in the cassette 18 is zero as determined in step 238, a "cassette empty" message will be generated at step 240. If the payout is in coupons, at step 242, the game is flagged to be disabled when the next coupon is won, at step 244, and monitoring continues at step 236. If the payment is not in coupons, at step 242, the hopper 16 will be disabled at step 246, with monitoring continuing at step 236. If the count of paper tokens 12 left in the cassette 18 is zero at step 238, and if the paper tokens 12 are paper money, all further payments will be made in coins if the remaining amount of payout is less than the lockup level of the hopper. If the further payment amount is more than the lockup level of the coin hopper, an attendant pay "tilt" will be declared. If a paper token 12 is not dispensed within a set period of time, such as three seconds, as determined at step 248, and as indicated by expiration of the timer for dispensing of paper tokens 12, a "jammed/misfeed" message will be sent to the host, at step 250. A "tilt" tower light will then be activated in game machine, the hopper 16 will be disabled, at step 246, and monitoring will continue at step 236. If a paper token 12 is not removed from the hopper 16 by the player within a set period of time, such as three seconds, as determined at step 252, a special sound will be produced to prompt the player at step 254, and monitoring will continue at step 236. If the count signal goes low at any unrequested time, as determined at step 256, a "run on" message will be sent at step 258, and the total of any paper tokens 12 overpaid and any cassette 18 overpays will be incremented at step 260. If none of these conditions occurs, monitoring continues at step 236.

There are functional responsibilities for each system interfacing with the memory device 94, and protocol is required to implement the cassette 18 with the memory device 94 therein with the hopper 16 and the gaming machine 14. The timing sequences of operation of the hopper 16 are: a motor-on signal is set high, which starts the hopper 16, and a jam timer is started; a paper token 12 reaches the end of the hopper, a count signal goes low, the jam timer is cleared, and a player timer is started. If a paper token 12 has not been removed prior to the time the player timer expires, a "paper token waiting" sound is played. A paper token 12 is removed from the hopper 16, and the count signal goes high. The next paper token 12 starts feeding, the paper token 12 waiting sound is stopped, and the jam timer is started.

If a paper token 12 is rejected, as for example when two paper tokens 12 are stuck together, a reject signal goes high, the rejected paper token 12 is diverted to the escrow area 68, and the jam timer is cleared. The rejected paper token 12 is in the escrow area, the reject signal goes low, the next paper token 12 starts feeding, and the jam timer is started.

If the hopper 16 is jammed, the jam timer expires, the hopper motor-on signal is set low, and a paper token 12 jammed message is sent. The paper token 12 is removed from the hopper 16, the count signal goes high, and the player timer is cleared. When all of the paper tokens 12 to be paid out have been dispensed, the hopper motor signal is set low.

If the cassette 18 runs empty, the last paper token leaves the cassette 18, and the cassette 18 empty signal goes high.

Therefore, in accordance with the present invention, initially, the cassette 18 may be filled with the paper tokens 12 of a particular denomination, and the cassette 18 may then be locked via the keys 64 inserted in the locks 62 so as to seal the cassette 18, as shown in FIGS. 4, and 8–9. The denomination of bills in the cassette 18 may then be stored in the memory element 94 of the cassette 18, and may be verified visually through the openings 66 in the cassette 18 or by color coding or other indicia on the cassette 18. The fill level of bills in the cassette 18 may be verified by openings (not shown) in the side of the cassette 18, such as for example a slot or a series of holes therein. The locked cassette 18 may then be inserted in the compartment 28 in the hopper 16, and the hopper 16 may then be locked through the keys 32 inserted in the locks 30, as shown in FIGS. 2–3 and 5. The hopper 16 may then be installed in a gaming machine 14. When the cassette 18 is removed from or replaced in the gaming machine 14, in non-docking station operation, the operator will be prompted to respond to a query asking if the cassette had been refilled. If no, regular initialization will continue. If yes, another prompt will ask the operator if the value in the fill amount of the number of the paper tokens 12 put into the cassette 18 previously should be used as the refill amount, with the default answer "yes".

Under software control, upon installation of the hopper 16 in gaming machine, the gaming machine 14 may test the functioning of the hopper 16, and information relating to the hopper 16 and the cassette 18 may be stored in a memory element in the gaming machine 14. In particular, in docking station operation, when the cassette 18 is installed in the gaming machine 14, the gaming machine 14 writes its identifier into the memory device 94 the cassette 18, and obtains the fill amount and denomination of bills from the memory device 94 in the cassette 18. The fill amount initializes the count to determine when the cassette 18 is low and empty, and the denomination is to test for a denomination mismatch or token operation. A zero value for the denomination will indicate that there are non-value coupons in the hopper 16. If the paper token 12 value is selected, it must be equal to or greater than the game's single credit value. If, however, the paper token 12 value selected is less than the game paper token value, the hopper 16 will be disabled.

For non-docking station operations, all parameters, such as fill amount, denomination of bills, and accounting for the cassette 18, are kept in the gaming machine 14. The gaming machine 14 will also maintain a set of game meters. The game meters will indicate the current paper tokens 12 in the cassette 18; the number of paper tokens in the escrow area 68; the number of paper tokens 12 dispensed during testing; the number of the paper tokens 12 actually dispensed, not including testing; and the total value of the paper tokens 12 dispensed, not including testing. The game meters for the count of the paper tokens 12 dispensed and total value of paper tokens 12 dispensed will be cumulative and will not be reset upon a fill of the paper tokens.

For docking station operation, the gaming machine 14 ascertains that the hopper 16 will be operated through use of docking station supported logic, information, and operation. The gaming machine 14 will maintain a set of meters, contained in and updated by the gaming machine 14, and an image of the memory device 94 model referred to as cassette meters. The game meters for the count of paper tokens 12 dispensed and total value of paper tokens 12 dispensed will be cumulative and will not be reset upon a fill of paper tokens. The count of the paper tokens 12 in the cassette 18, the paper tokens 12 rejected, and the paper tokens 12 dispensed during testing will be reset upon a fill of paper tokens or upon a new cassette 18 being installed in a gaming machine 14.

A player may then insert a wager in the wager accepting mechanism 26 in the gaming machine 14, play the game, and if he or she wins the game, the paper tokens 12 are dispensed through the slot 36 at a location in the gaming machine 14 where the player will be aware of the dispensing thereof.

The paper tokens 12 are transported through the payout path 42 in the cassette 18 and the hopper 16, for dispensing thereof by the interaction of the cassette transport mechanism 40 and the hopper transport mechanism 38, as shown in FIGS. 8–9. The motors 56 and 58 drive the gears 48 and the rollers 44 in the hopper 16 which engage and drive the gears 54 and the rollers 50 in the cassette 18 to pull a single paper token 12 from the paper tokens on the tray 88 biased upwardly by the spring 90, and to transport the paper token along the payout path 42 until it projects through the slot 36, where it awaits removal by the player. Upon removal of a paper token 12 by the player, a further paper token 12 is transported through the payout path 42 so as to project through the slot 36 for removal by the player, until the amount of the payout has been dispensed.

A paper token 12, while being transported along the payout path 42 through the cassette 18 and the hopper 16, passes sensors which sense payout status, including the sensor 74 proximate the beginning of the payout path 42, for sensing that a paper token 12 is in the cassette transport mechanism 40 and out of the cassette 18. The sensor 78 senses that a paper token 12 has reached the location thereof. The sensors 80 proximate the end of the payout path 42 sense that a paper token 12 has reached the location thereof, that it is projecting through the slot 36, and that a person has removed the paper token 12 therefrom.

Other sensors in the hopper 16 and the cassette 18 sense conditions relating to operations thereof and the status of the supply of paper tokens 12. The sensors 82 are mounted on elements for flagging conditions of the motors 56 and 58, such as that the motors are running, the length of time the motors are running, or that the motors are running slowly, and to measure the length of the bills being dispensed. The sensors 84 project an optical beam across and diagonal to the paper tokens 12, to sense when the cassette 20 is empty. The sensor 86 is used to detect low condition of the paper tokens 12. A mechanical flag is connected to and operable with a tray 88 which supports the paper tokens 12, which tray 88 is biased by a spring 90 to be movable upwardly as the paper tokens are dispensed, and activates a reflective sensor 92 upon low condition of the paper tokens to indicate such condition.

If more than a single paper token 12, e.g. as when two paper tokens 12 are stuck together, moves along the payout path 42, this condition is sensed by the sensors 76, which activate the solenoid actuated diverting mechanism 70, actuating the diverters 72 to direct such paper tokens into the escrow area 68 for storage therein, as shown in FIGS. 8-9.

Security and accounting information relating to the paper tokens 12, the hopper 16, and the cassette 18 may then be stored in the memory device 94. Such stored information includes an identifier for the cassette 18, different from the identifiers for the other cassettes 18 in the system 10 and an identifier for a gaming machine 14 in which a cassette 18 has been installed, which identifier is different from identifiers for other gaming machines 14. It further include the number of the paper tokens 12 that have been diverted to the escrow section 68, the denomination of bills in the cassette 18, and the number of the paper tokens 12 loaded in the cassette 18. Also included are the number of the paper tokens 12 dispensed by the hopper 16, incremented each time a paper token 12 is dispensed by the hopper 16, and the number of the paper tokens 12 dispensed by the hopper 16 during non-payout of the paper tokens 12, as during testing and maintenance of the gaming machine 14. Further included are the date and time of installation of the hopper 16 in a gaming machine 14 and the date and time of filling the cassette 18 with the paper tokens 12. Also included are an identifier of a person last accessing the cassette 18, wherein the identifier of each person authorized to have access to the cassette 18 is different from the identifier for each other authorized person, and a data integrity check for insuring the integrity of the stored information.

Messages relating to security and accounting functions of the gaming machine 14 may then be sent by a communicating device in the gaming machine 14 to a central monitoring system, including: the unique identifiers of the cassette 18 and the gaming machine 14 in which the cassette 18 is installed; that the hopper 16 is about to dispense a paper token 12, adapted to be sent prior to the start of dispensing of a paper token 12; that a paper token 12 has or has not been dispensed or the number of the paper tokens 12 to be dispensed by the hopper 16 for each payout; that the hopper 16 has been installed or removed from the gaming machine 14; that the cassette 18 continues to dispense the paper tokens 12 to a player after paying out to the player the number of the paper tokens 12 to be dispensed in a payout; or that the hopper 16 has been prevented from dispensing a paper token 12.

Monitoring of security and accounting functions of the gaming machine 14 may then be conducted by devices which monitor when a message has not been received from the gaming machine 14 that a paper token 12 has been dispensed, within a period of time after receipt of a message from the gaming machine 14 that dispensing of a paper token 12 is about to start; that the cassette 18 does not have any paper tokens 12 remaining therein; the dispensing of a paper token 12 from the gaming machine 14; the installation and removal of the hopper 16 relative to the gaming machine 14; or the installation and removal of the cassette 18 relative to the hopper 16.

The present invention provides improved systems and methods for dispensing tokens from gaming machines in a secure, verifiable, reliable, and convenient manner, while enhancing player satisfaction and excitement and reducing operating and maintenance costs.

In accordance with the present invention, the system and method provide for the effective dispensing of paper tokens under the control of software, from a securely locked cassette and hopper, wherein the paper tokens are effectively transported therethrough and rejected paper tokens are directed into an escrow area therein, the dispensing takes place in plain view of the player and of the security monitoring system, and the cassette memory device securely stores critical operational, security and accounting information which is communicated to the central system from the gaming machine.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A system for dispensing a payout to a player from a gaming machine responsive to the play of a game in the gaming machine, comprising:

means for dispensing a payout to a player responsive to the play of a game in the form of paper tokens, wherein the dispensing means are adapted to be installed in a gaming machine;

software means for controlling the payout of the paper tokens to the player responsive to the play of the game; and a gaming machine, in which the dispensing means are mounted, which includes a housing including a front panel, wherein the dispensing means are located in the housing adjacent the front panel in plain view of a player so as to dispense the payout from the gaming machine at about eye level and in plain view of the player responsive to the play of the game.

2. The system of claim 1, wherein the dispensing means are further adapted to enable installation of the paper tokens in the dispensing means prior to installation of the dispensing means in the gaming machine.

3. The system of claim 1, wherein the dispensing means are located proximate the top of the housing front panel.

4. The system of claim 1, wherein the dispensing means are located in the right side of the housing front panel.

5. The system of claim 1, wherein the gaming machine includes a game play display, and the dispensing means are located proximate the game play display.

6. The system of claim 1, wherein the gaming machine further includes means for accepting a wager, and the dispensing means are located above the accepting means in the gaming machine housing.

7. The system of claim 1, wherein the gaming machine further includes means for accepting a wager, and the dispensing means are aligned with the accepting means.

8. The system of claim 1, wherein the gaming machine further includes means for accepting a wager, and the dispensing means are adapted to be located relative to the accepting means in the gaming machine housing such that a central line of a paper token dispensed by the dispensing means is in line with a central line of a wager accepted by the accepting means.

9. A system for dispensing a payout to a player from a gaming machine responsive to the play of a game in the gaming machine, comprising:

a dispenser adapted to dispense a payout in the form of paper tokens, wherein the dispenser is adapted for use with the gaming machine;

software means for controlling the payout of the paper tokens to a player responsive to the play of a game; and a gaming machine, which includes a housing including a front panel, wherein the dispenser is located in the housing adjacent the front panel in plain view of a player from the gaming machine so as to dispense the payout to the player at about eye level and in plain view of the player responsive to the play of the game.

10. A system for dispensing a payout to a player from a gaming machine responsive to the play of a game in the gaming machine, comprising:

a gaming machine;

means for dispensing a payout to a player responsive to the play of a game in the form of paper tokens, wherein the dispensing means are adapted to be installed in the gaming machine;

software means for controlling the payout of the paper tokens to the player responsive to the play of the game; and a central system for monitoring the gaming machine, wherein the gaming machine includes means for communicating with the central system.

11. The system of claim 10, wherein the gaming machine communicating means comprises means for sending a message to the central monitoring system.

12. The system of claim 10, wherein in the central monitoring system includes means for communicating with the gaming machine.

13. A system for dispensing a payout from a gaming machine, comprising:

a gaming machine:

a dispenser adapted to dispense a payout in the form of paper tokens, wherein the dispenser is adapted for use with the gaming machine;

software means for controlling the payout of the paper tokens to the player responsive to the play of the game; and a central system for monitoring the gaming machine, wherein the gaming machine includes means for communicating with the central system.

* * * * *

UNITED STATES PATENT AND TRADEMARK OFFICE

CERTIFICATE OF CORRECTION

PATENT NO : 6,125,307

DATED : September 26, 2000

INVENTOR(S) : Raymond J. Heidel et al.

It is certified that error appears in the above-identified patent and that said Letters Patent are hereby corrected as shown below:

In the Title, change "Transportsystem" to --Transport System--.

Column 6, line 5 after the word "is" add --a--.

Column 13, line 24, delete one of the words "is".

Column 16, line 27 after the words "operation continues", add a period and start a new paragraph beginning with the word "Upon".

Column 23, line 6, change "include" to -includes--.

Signed and Sealed this

Eighth Day of May, 2001

*Attest:*

Nicholas P. Godici

NICHOLAS P. GODICI

*Attesting Officer*

*Acting Director of the United States Patent and Trademark Office*